(12) United States Patent
Johnson et al.

(10) Patent No.: US 12,220,051 B2
(45) Date of Patent: *Feb. 11, 2025

(54) MOLDED PLASTIC STRUCTURES

(71) Applicant: LIFETIME PRODUCTS, INC., Clearfield, UT (US)

(72) Inventors: Mitch Johnson, South Weber, UT (US); Wendell Peery, Kaysville, UT (US)

(73) Assignee: LIFETIME PRODUCTS, INC, Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,183

(22) Filed: Sep. 25, 2023

(65) Prior Publication Data
US 2024/0008638 A1    Jan. 11, 2024

Related U.S. Application Data

(63) Continuation of application No. 17/662,613, filed on May 9, 2022, now Pat. No. 11,766,117, which is a
(Continued)

(51) Int. Cl.
    *A47B 13/08*    (2006.01)
    *A47B 3/091*    (2006.01)
    (Continued)

(52) U.S. Cl.
    CPC .............. *A47B 13/08* (2013.01); *A47B 3/0912* (2013.01); *B29C 49/0031* (2013.01);
    (Continued)

(58) Field of Classification Search
    CPC .......... A47B 2230/16; A47B 2200/001; A47B 2220/008; A47B 7/00; A47B 3/0912;
    (Continued)

(56) References Cited

U.S. PATENT DOCUMENTS

| 4,280,805 A | 7/1981 | Hafele |
| 4,379,688 A | 4/1983 | Tate |

(Continued)

FOREIGN PATENT DOCUMENTS

| CN | 102293518 | 12/2011 |
| CN | 104939514 | 9/2015 |

(Continued)

OTHER PUBLICATIONS

The European Search Report issued on May 21, 2021 in connection to Application No. 18879496.0-1005/3697607.
(Continued)

*Primary Examiner* — Janet M Wilkens
(74) *Attorney, Agent, or Firm* — Maschoff Brennan

(57) ABSTRACT

A plastic molded lip structure may extend along a perimeter of a planar element and may include an outer wall, an inner wall, structural portions, and protruded features. The outer wall may extend in a normal direction from the planar element. The inner wall may be disposed in an inward direction relative to the outer wall. The structural portions may be disposed along structural sections of the perimeter and may include first portions of the inner wall and of the outer wall. The first portions may be disposed parallel to the inner wall and separated from the first portions by a first distance along the structural sections. The protruded features may be interposed between two structural portions and an inner wall may be separated from second portions of the outer wall by a second distance that is greater than the first distance.

20 Claims, 24 Drawing Sheets

Related U.S. Application Data continuation of application No. 16/192,581, filed on Nov. 15, 2018, now Pat. No. 11,324,311.

(60) Provisional application No. 62/682,668, filed on Jun. 8, 2018, provisional application No. 62/588,812, filed on Nov. 20, 2017.

(51) Int. Cl.
 *B29C 49/00* (2006.01)
 *B29C 49/48* (2006.01)
 *B29L 31/44* (2006.01)

(52) U.S. Cl.
 CPC ..... A47B 2200/001 (2013.01); B29C 49/4812 (2022.05); B29K 2995/0077 (2013.01); B29K 2995/0082 (2013.01); B29L 2031/448 (2013.01)

(58) Field of Classification Search
 CPC ......... A47B 3/087; A47B 3/091; A47B 13/08; B29C 49/0031; B29C 2049/4812; B29K 2995/007; B29K 2995/0082; B29L 2031/448
 USPC ....... 108/901, 902, 151, 129–133, 155, 157, 108/16, 27, 161, 115, 157.16
 See application file for complete search history.

(56) References Cited

U.S. PATENT DOCUMENTS

| | | | |
|---|---|---|---|
| 4,727,816 A | 3/1988 | Virtue |
| 6,912,961 B2 | 7/2005 | Winter |
| 6,968,789 B2 | 11/2005 | Baik |
| 7,051,662 B2 | 5/2006 | Shenghao |
| 7,059,254 B2 | 6/2006 | Strong |
| 7,069,865 B2 | 7/2006 | Strong |
| 7,096,799 B2 | 8/2006 | Strong |
| 7,111,563 B2 | 9/2006 | Strong |
| 7,150,237 B2 | 12/2006 | Lin et al. |
| 7,171,910 B2 | 2/2007 | Neunzert |
| 7,278,361 B2 | 10/2007 | Zhurong |
| 7,331,297 B2 | 2/2008 | Strong |
| 7,469,646 B2 | 12/2008 | Baik |
| 7,475,642 B2 | 1/2009 | Shenghao |
| 7,475,643 B2 | 1/2009 | Haney |
| 7,475,644 B2 | 1/2009 | Strong |
| 7,640,870 B2 | 1/2010 | Strong |
| 7,644,667 B2 | 1/2010 | Strong |
| 7,713,603 B2 | 5/2010 | Farran et al. |
| D619,831 S | 7/2010 | Branch |
| 7,905,185 B2 | 3/2011 | Peery et al. |
| D640,487 S | 6/2011 | Bennett |
| 7,971,930 B2 | 7/2011 | Larsen |
| 8,006,630 B2 | 8/2011 | Strong |
| 8,033,228 B2 | 10/2011 | Haney |
| 8,156,875 B2 | 4/2012 | Neunzert |
| D658,912 S | 5/2012 | Winter |
| D659,450 S | 5/2012 | Winter |
| 8,166,894 B1 | 5/2012 | Branch |
| 8,181,579 B2 | 5/2012 | Leng |
| D662,736 S | 7/2012 | Peery |
| D662,738 S | 7/2012 | Winter |
| D667,659 S | 9/2012 | Winter |
| 8,261,676 B2 | 9/2012 | VanNimwegen et al. |
| D668,483 S | 10/2012 | Bennett |
| 8,302,541 B2 | 11/2012 | Haney |
| D671,773 S | 12/2012 | Johnson |
| D671,775 S | 12/2012 | Clegg |
| D671,776 S | 12/2012 | Clegg |
| D672,175 S | 12/2012 | Peery |
| 8,342,107 B2 | 1/2013 | Strong et al. |
| 8,347,795 B2 | 1/2013 | Peery |
| 8,397,652 B2 | 3/2013 | Peery |
| 8,397,653 B2 | 3/2013 | Ashby |
| 8,408,146 B2 | 4/2013 | Peery |
| D681,982 S | 5/2013 | Clegg |
| D682,586 S | 5/2013 | Clegg |
| D683,985 S | 6/2013 | Nye |
| D688,496 S | 8/2013 | Bennett |
| 8,534,205 B1 | 9/2013 | Johnson |
| 8,544,393 B2 | 10/2013 | Branch |
| 8,555,789 B2 | 10/2013 | Jin |
| 8,555,790 B2 | 10/2013 | Winter |
| 8,555,791 B2 | 10/2013 | Jin |
| 8,578,863 B2 | 11/2013 | Peery |
| 8,578,865 B2 | 11/2013 | Haney |
| D696,882 S | 1/2014 | Clegg |
| 8,622,007 B2 | 1/2014 | Peery |
| D700,465 S | 3/2014 | Johnson |
| 8,677,912 B1 | 3/2014 | Tsai |
| 8,683,929 B2 | 4/2014 | Peery |
| 8,720,990 B2 | 5/2014 | Boydston |
| 8,726,817 B2 | 5/2014 | Bennett |
| 8,746,155 B2 | 6/2014 | Haney |
| 8,757,069 B2 | 6/2014 | Peery |
| D708,462 S | 7/2014 | Nye |
| D715,081 S | 10/2014 | Bennett |
| 8,857,349 B2 | 10/2014 | Peery |
| 8,904,943 B2 | 12/2014 | Jin |
| 8,943,982 B2 | 2/2015 | Peery |
| D727,074 S | 4/2015 | Johnson |
| 8,997,663 B2 | 4/2015 | Peery |
| D733,475 S | 7/2015 | Johnson |
| D734,081 S | 7/2015 | Johnson |
| 9,101,209 B2 | 8/2015 | Bennett |
| D739,672 S | 9/2015 | Johnson |
| D739,673 S | 9/2015 | Johnson |
| 9,138,050 B2 | 9/2015 | Peery |
| D742,671 S | 11/2015 | Johnson |
| 9,173,482 B2 | 11/2015 | Peery |
| 9,192,229 B2 | 11/2015 | Peery |
| 9,192,230 B2 | 11/2015 | Clegg |
| D748,418 S | 2/2016 | Johnson |
| 9,277,808 B2 | 3/2016 | Cai |
| 9,307,831 B2 | 4/2016 | Peery |
| D756,694 S | 5/2016 | Johnson |
| 9,351,563 B2 | 5/2016 | Bennett |
| D759,411 S | 6/2016 | Johnson |
| 9,486,076 B2 | 11/2016 | Peery |
| 9,532,644 B2 | 1/2017 | Nye |
| 9,549,612 B2 | 1/2017 | Peery |
| 9,591,918 B2 | 3/2017 | Nye |
| 9,642,459 B2 | 5/2017 | Peery |
| 9,661,916 B2 | 5/2017 | Peery |
| 9,730,514 B2 | 8/2017 | Peery |
| 9,763,513 B2 | 9/2017 | Cai |
| 9,763,517 B2 | 9/2017 | Peery |
| 9,848,699 B2 | 12/2017 | Peery |
| 10,092,091 B1 | 10/2018 | Wang |
| D863,853 S | 10/2019 | Johnson |
| D864,637 S | 10/2019 | Johnson |
| 10,932,560 B2 | 3/2021 | Leng |
| 11,324,311 B2 | 5/2022 | Johnson et al. |
| 11,730,262 B2 | 8/2023 | Johnson |
| 11,766,116 B2 | 9/2023 | Johnson et al. |
| 11,766,117 B2 | 9/2023 | Johnson et al. |
| 11,930,919 B2 | 3/2024 | Johnson |
| 2003/0217676 A1 | 11/2003 | Strong |
| 2003/0233968 A1 | 12/2003 | Strong |
| 2005/0103239 A1 | 5/2005 | Neunzert |
| 2005/0160950 A1 | 7/2005 | Haney |
| 2005/0274306 A1 | 12/2005 | Strong |
| 2006/0230989 A1 | 10/2006 | Haney |
| 2007/0199483 A1 | 8/2007 | Peery et al. |
| 2011/0253015 A1 | 10/2011 | Trimble et al. |
| 2012/0266787 A1 | 10/2012 | Peery |
| 2013/0055930 A1 | 3/2013 | Peery |
| 2013/0081560 A1 | 4/2013 | Peery et al. |
| 2013/0291481 A1 | 11/2013 | Haney |
| 2014/0060399 A1 | 3/2014 | Peery |
| 2014/0175710 A1 | 6/2014 | Groman |
| 2016/0051049 A1 | 2/2016 | Peery |

(56) References Cited

U.S. PATENT DOCUMENTS

| | | |
|---|---|---|
| 2017/0238698 A1 | 8/2017 | Nye |
| 2019/0150608 A1 | 5/2019 | Johnson |
| 2020/0214440 A1 | 7/2020 | Johnson |
| 2020/0337452 A1 | 10/2020 | Leng |
| 2021/0022502 A1 | 1/2021 | Jiang |
| 2021/0330073 A1 | 10/2021 | Choi |
| 2022/0031072 A1 | 2/2022 | Lin |
| 2022/0281204 A1 | 9/2022 | Jiang |
| 2022/0288835 A1 | 9/2022 | Jiang |
| 2023/0062885 A1 | 3/2023 | Johnson |
| 2023/0389694 A1 | 12/2023 | Johnson |
| 2024/0008639 A1 | 1/2024 | Johnson |
| 2024/0215710 A1 | 7/2024 | Johnson |

FOREIGN PATENT DOCUMENTS

| | | |
|---|---|---|
| EP | 300353 A1 | 3/2016 |
| EP | 3000353 | 3/2016 |
| WO | 2017045579 | 3/2017 |
| WO | 2017/147245 A1 | 8/2017 |
| WO | 2017147245 | 8/2017 |
| WO | 2021013264 | 1/2021 |

OTHER PUBLICATIONS

Taiwan Office Action, as issued in connection with Taiwan Application No. 107141021, dated May 21, 2019, 29 pages.

Taiwan Office Action, as issued in connection with Taiwan Application No. 107141021, dated Oct. 5, 2019, 7 pages.

Engineering Library, Beam Torsion from "stress Analysis Manual" Air Force Flight Dyamics Laboratory, Oct. 1986 https://engineeinglibrary.org/reference/beam-torsion-ari-force-stress (year 1986).

Science Direct, Closed Section Beam excerpts from various books of dates, https://wwww.science direct.com/topics/engineering/closed-section-beam (year: 2022).

MOLDED PLASTIC STRUCTURES

CROSS-REFERENCE TO RELATED APPLICATIONS

This application is a continuation of U.S. patent application Ser. No. 17/662,613, filed May 9, 2022, now U.S. Pat. No. 11,766,117, issued Sep. 26, 2023, which is a continuation of U.S. patent application Ser. No. 16/192,581, filed Nov. 15, 2018, now U.S. Pat. No. 11,324,311, issued May 10, 2022, which claims priority to and the benefit of U.S. Provisional Patent Application Ser. No. 62/588,812, filed Nov. 20, 2017, and U.S. Provisional Patent Application Ser. No. 62/682,668, filed Jun. 8, 2018, each of which is hereby incorporated by reference in its entirety.

BACKGROUND

Field of the Invention

The present invention generally relates to structures including at least a portion constructed from plastic and, more particularly, to furniture, such as tables, that may include molded plastic components.

Description of Related Art

Many different types of tables are known and are used for a variety of purposes. For example, conventional tables may include legs that are pivotally attached to a tabletop and the legs may be movable between a use position in which the legs extend outwardly from the tabletop and a storage position in which the legs are folded against the tabletop. Conventional tables with relatively large tabletops and folding legs are often referred to as "banquet tables" and these tables are frequently used in assembly halls, banquet halls, convention centers, hotels, schools, churches, and other locations where large groups of people meet. These tables can often be positioned in an assortment of configurations and used in a variety of settings. When the banquet tables are no longer needed, the table legs can be moved into the storage position and the tables may be more easily moved or stored.

Conventional tables often include tabletops constructed from materials such as wood, particleboard, or metal. Tabletops constructed from wood, particleboard, or metal, however, are often relatively heavy and this may make the table awkward or difficult to move. Tabletops constructed from wood or metal are also relatively expensive and these types of tabletops must generally be treated or finished before use. For example, tabletops constructed from wood must generally be sanded and painted, and metal tabletops must be formed into the desired shape and painted. In addition, because these wooden and metal tabletops are relatively heavy, the cost of shipping and transportation of the tables may be increased. The weight of the tabletop may make the tables more difficult to move and store.

In order to decrease the weight of conventional tables, tabletops may be constructed from relatively lightweight materials such as plastic. Disadvantageously, tabletops constructed from lightweight materials may require large reinforcing members or other structural parts such as braces, brackets, support members and the like to strengthen the tabletop. While these additional parts may increase the strength of the tabletop, the added parts may also increase the weight of the table. These additional parts may result in increased manufacturing costs and require additional time to assemble the table. In addition, extra fasteners may be required to assemble and connect these parts to the table, which may require extra time and labor during the manufacturing process. The additional parts and fasteners may further increase the cost of the table and make the table more difficult to manufacture. Moreover, these additional parts and fasteners may have sharp edges that can injure a user's legs or arms.

Conventional tables may include a frame that is connected to the tabletop. The frame may include a pair of side rails connected to sides of the tabletop using fasteners. Multiple fasteners may be required to securely connect the frame to the tabletop. When a relatively large load or force is applied to some known tables, the frame may bend, deform, and/or detach from the tabletop. In addition, the fasteners used to connect the frame to the tabletop may detach or separate from the tabletop. The fasteners may even damage and tear through the tabletop if the load or force exceeds a certain amount.

The tabletops of some known tables may be damaged if a relatively large load or force is applied. For example, a portion of the tabletop may bend or deform if a large load or force is applied to that portion of the tabletop. For instance, if a load or force is applied to an outer portion of the tabletop, that outer portion of the tabletop may undesirably bend or deform. In particular, the outer portion of the tabletop may be damaged, dented, or broken.

BRIEF SUMMARY

A need therefore exists for a table that eliminates or diminishes the above-described disadvantages and problems.

One aspect is a structure that may be constructed from plastic. For example, the structure may be constructed from molded plastic. If desired, the structure may be constructed from blow-molded plastic.

Another aspect is a structure that may include a generally planar element, such as a central or body portion of a tabletop with a generally planar upper and/or lower surface, and a projecting or protruding structure, such as a lip. The lip may include and/or form at least a portion of a sidewall or edge of the tabletop. The generally planar element and the lip may be constructed from molded plastic, such as blow-molded plastic. The generally planar element and the lip may be integrally formed as part of a unitary, one-piece construction during a blow-molding process. The structure may include a tabletop, which may be sized and configured to nest with an adjacent table to reduce a height of a plurality of stacked tables in a nested configuration. The structure may also include an article of furniture, a picnic table, a component of a playground a component of a shed, a component of a chair, and the like.

Still another aspect is a plastic molded lip structure, which may extend along at least a part of a perimeter of a planar element, and the lip structure may include a lip, sidewall, and/or edge of the structure. The lip structure may also include an outer wall, an inner wall, structural portions, protruded features, a joint, a side, an end, and/or the like. The outer wall may extend in a substantially normal direction from the planar element. The inner wall may be disposed in an inward direction relative to the outer wall. The structural portions may be disposed along structural sections of the perimeter. The structural portions may include first portions of the inner wall and first portions of the outer wall. The first portions of the outer wall may be disposed substantially parallel to the first portions of the inner wall and may be separated from the first portions of the inner wall by a first distance. The protruded features may be disposed between two structural portions of the structural portions. One or more of the protruded features may include second portions of the outer wall that extend substantially normal to the perimeter and second portions of the inner wall. The second portions of the inner wall may be separated from the second portions of the outer wall by a second distance which may be greater than the first distance. The joint may be disposed on the structural sections. The joint may connect the planar element to the inner wall and the outer wall. The protruded features may interrupt the joint. The inner wall and the outer wall may be integrated at the joint. The joint may include an exterior surface that may be substantially parallel to the planar element and the exterior surface may be displaced relative to a planar surface of the planar element. The outer wall may include a first outer wall end that may be disposed at the perimeter of the planar element and a terminal outer wall portion, which may be opposite the first outer wall end. The inner wall may include a first inner wall end that may be disposed at an inner surface of the planar element and a terminal inner wall portion, which may be positioned opposite the first inner wall end. The terminal inner wall portion of the inner wall and/or the terminal outer wall portion of the outer wall may be joined to form a lip end. The inner wall, the outer wall, the joint, and the lip end may at least partially define a first cavity along the structural sections and second cavities. One or more or each of the second cavities may be disposed within one of the protruded features. The second distance by which the second portions of the inner wall is separated from the second portions of the outer wall may decrease between the first inner wall end and the terminal inner wall portion. The structural sections may include greater than about fifty percent (50%) of the perimeter, greater than about sixty percent (60%) of the perimeter, greater than about seventy percent (70%) of the perimeter, greater than about eighty percent (80%) of the perimeter, or greater than about ninety percent (90%) of the perimeter. The end may be connected to the side by a corner. A first number of the protruded features may be disposed along the end. A second number of the protruded features may be disposed along the side. In detail, the end may include a length of about thirty (30) inches and the first number of the protruded features may be nine (9) protruded features or another suitable number of protruded features. Additionally, the side may include a length of about seventy-two (72) inches and the second number of the protruded features may be twenty-three (23) protruded features or another suitable number of protruded features. The first number of the plurality of protruded features may be evenly or unevenly disposed along the end. Additionally or alternatively, the second number of the plurality of protruded features may be evenly or unevenly disposed along the side. Two or more of the first number of the protruded features disposed along the end may include rounded protruded features. Two or more of the second number of the protruded features disposed along the side may include rectangular protruded features.

Advantageously, the structure may have different shapes, sizes, configurations, and arrangements depending, for example, upon the intended use of the structure. For example, the structure could be a tabletop and the tabletop may be sized and configured to nest with a tabletop of an adjacent table to reduce a height of a plurality of stacked tables in a nested configuration. In an exemplary embodiment, the generally planar element of the structure could be a top or upper surface of the tabletop, or a lower or bottom surface of the tabletop. For instance, the generally planar element may form a bottom surface of the tabletop and one or more depressions (which may also be referred to as tack-offs) may be disposed in the bottom surface of the tabletop. The depressions may extend into the one or more volumes disposed between the upper and lower surfaces of the tabletop. The depressions may be integrally formed during a molding process as part of a unitary, one-piece construction along with the generally planar element and the lip. One skilled in the art, after reviewing this disclosure, will appreciate that the structure may include a tabletop sized and configured to nest with an adjacent table to reduce a height of a plurality of stacked tables in a nested configuration, an article of furniture such as a chair or a picnic table, a component of a playground, a component of a shed, a component of a chair, and the like.

Yet another aspect is a structure that may include a planar element that is substantially oriented in a first plane. The planar element may be comprised of a first layer of material and a second layer of the material such that one or more volumes are defined between at least a portion of a first inner surface of the first layer and a second inner surface of the second layer. The planar element may include a bottom surface in which depressions are defined. The depressions may extend into a volume defined in the planar element. The structure may also include a plastic molded lip structure, which may extend along at least a part of a perimeter of a planar element. The lip structure may include an outer wall, an inner wall, structural portions, protruded features, a joint, a side, an end, and/or the like. The outer wall may extend in the substantially normal direction from the planar element. The inner wall may be disposed in an inward direction relative to the outer wall. The structural portions may be disposed along structural sections of the perimeter. The structural portions may include first portions of the inner wall and first portions of the outer wall. The first portions of the outer wall may be disposed substantially parallel to the first portions of the inner wall and may be separated from the first portions of the inner wall by a first distance along the structural sections. The protruded features may be disposed between two structural portions of the structural portions. One or more of the protruded features may include second portions of the outer wall that extend substantially normal to the perimeter and second portions of the inner wall. The second portions of the inner wall may be separated from the second portions of the outer wall by a second distance which may be greater than the first distance. The joint may be disposed on the structural sections. The joint may connect the planar element to the inner wall and the outer wall. The protruded features may interrupt the joint. The inner wall and the outer wall may be integrated at the joint. The joint may include an exterior surface that may be substantially parallel to the planar element and the exterior surface may be displaced relative to a planar surface of the planar element. The outer wall may include a first outer wall end that may be disposed at the perimeter of the planar element and a terminal outer wall portion, which may be opposite the first outer wall end. The inner wall may include a first inner wall end that may be disposed at an inner surface of the planar element and a terminal inner wall portion, which may be positioned opposite the first inner wall end. The terminal inner wall portion of the inner wall and/or the terminal outer wall portion of the outer wall may be joined to form a lip end. The inner wall, the outer wall, the joint, and the lip end may at least partially define a first cavity along the structural sections and second cavities. One or more or each of the second cavities may be disposed within one of the protruded features. The second distance by which the second portions of the inner wall is separated from the second portions of the outer wall may decrease between the first inner wall end and the terminal inner wall portion. The structural sections may include greater than about fifty percent (50%) of the perimeter, greater than about sixty percent (60%) of the perimeter, greater than about seventy percent (70%) of the perimeter, greater than about eighty percent (80%) of the perimeter, or greater than about ninety percent (90%) of the perimeter. The end may be connected to the side by a corner. A first number of the protruded features may be disposed along the end. A second number of the protruded features may be disposed along the side. In detail, the end may include a length of about thirty (30) inches and the first number of the protruded features may be nine (9) protruded features or another suitable number of protruded features. Additionally, the side may include a length of about seventy-two (72) inches and the second number of the protruded features may be twenty-three (23) protruded features or another suitable number of protruded features. The first number of the plurality of protruded features may be evenly or unevenly disposed along the end. Additionally or alternatively, the second number of the plurality of protruded features may be evenly or unevenly disposed along the side. Two or more of the first number of the protruded features disposed along the end may include rounded protruded features. Two or more of the second number of the protruded features disposed along the side may include rectangular protruded features.

Still another aspect is a tabletop, which may include a lip structure and the lip structure may extend along at least a part of a perimeter of a planar element. The lip structure may include a lip, sidewall, and/or edge. The lip structure may also include an outer wall, an inner wall, structural portions, protruded features, a joint, a side, an end, and/or the like. The outer wall may extend in the substantially normal direction from the planar element. The inner wall may be disposed in an inward direction relative to the outer wall. The structural portions may be disposed along structural sections of the perimeter. The structural portions may include first portions of the inner wall and first portions of the outer wall. The first portions of the outer wall may be disposed substantially parallel to the first portions of the inner wall and may be separated from the first portions of the inner wall by a first distance. The protruded features may be disposed between two structural portions of the structural portions. One or more of the protruded features may include second portions of the outer wall that extend substantially normal to the perimeter and second portions of the inner wall. The second portions of the inner wall may be separated from the second portions of the outer wall by a second distance which may be greater than the first distance. The joint may be disposed on the structural sections. The joint may connect the planar element to the inner wall and the outer wall. The protruded features may interrupt the joint. The inner wall and the outer wall may be integrated at the joint. The joint may include an exterior surface that may be substantially parallel to the planar element and the exterior surface may be displaced relative to a planar surface of the planar element. The outer wall may include a first outer wall end that may be disposed at the perimeter of the planar element and a terminal outer wall portion, which may be opposite the first outer wall end. The inner wall may include a first inner wall end that may be disposed at an inner surface of the planar element and a terminal inner wall portion, which may be positioned opposite the first inner wall end. The terminal inner wall portion of the inner wall and/or the terminal outer wall portion of the outer wall may be joined to form a lip end. The inner wall, the outer wall, the joint, and the lip end may at least partially define a first cavity along the structural sections and second cavities. One or more or each of the second cavities may be disposed within one of the protruded features. The second distance by which the second portions of the inner wall is separated from the second portions of the outer wall may decrease between the first inner wall end and the terminal inner wall portion. The structural sections may include greater than about fifty percent (50%) of the perimeter, greater than about sixty percent (60%) of the perimeter, greater than about seventy percent (70%) of the perimeter, greater than about eighty percent (80%) of the perimeter, or greater than about ninety percent (90%) of the perimeter. The end may be connected to the side by a corner. A first number of the protruded features may be disposed along the end. A second number of the protruded features may be disposed along the side. In detail, the end may include a length of about thirty (30) inches and the first number of the protruded features may be nine (9) protruded features or another suitable number of protruded features. Additionally, the side may include a length of about seventy-two (72) inches and the second number of the protruded features may be twenty-three (23) protruded features or another suitable number of protruded features. The first number of the plurality of protruded features may be evenly or unevenly disposed along the end. Additionally or alternatively, the second number of the plurality of protruded features may be evenly or unevenly disposed along the side. Two or more of the first number of the protruded features disposed along the end may include rounded protruded features. Two or more of the second number of the protruded features disposed along the side may include rectangular protruded features.

Another aspect is a table that may be sized and configured to nest with an adjacent table to reduce a height of the stacked tables in a nested configuration. Each table of the stacked tables may have substantially the same size and configuration. The table may include a tabletop with a lip structure. The lip structure may extend along at least a part of a perimeter of a planar element of the tabletop. The lip structure may include an outer wall, an inner wall, structural portions, protruded features, a joint, a side, an end, and/or the like. The outer wall may extend in the substantially normal direction from the planar element. The inner wall may be disposed in an inward direction relative to the outer wall. The structural portions may be disposed along structural sections of the perimeter. The structural portions may include first portions of the inner wall and first portions of the outer wall. The first portions of the outer wall may be disposed substantially parallel to the first portions of the inner wall and may be separated from the first portions of the inner wall by a first distance along the structural sections. The protruded features may be disposed between two structural portions of the structural portions. One or more of the protruded features may include second portions of the outer wall that extend substantially normal to the perimeter and second portions of the inner wall. The second portions of the inner wall may be separated from the second portions of the outer wall by a second distance which may be greater than the first distance. The joint may be disposed on the structural sections. The joint may connect the planar element to the inner wall and the outer wall. The protruded features may interrupt the joint. The inner wall and the outer wall may be integrated at the joint. The joint may include an exterior surface that may be substantially parallel to the planar element and the exterior surface may be displaced relative to a planar surface of the planar element. The outer wall may include a first outer wall end that may be disposed at the perimeter of the planar element and a terminal outer wall portion, which may be opposite the first outer wall end. The inner wall may include a first inner wall end that may be disposed at an inner surface of the planar element and a terminal inner wall portion, which may be positioned opposite the first inner wall end. The terminal inner wall portion of the inner wall and/or the terminal outer wall portion of the outer wall may be joined to form a lip end. The inner wall, the outer wall, the joint, and the lip end may at least partially define a first cavity along the structural sections and second cavities. One or more or each of the second cavities may be disposed within one of the protruded features. The second distance by which the second portions of the inner wall is separated from the second portions of the outer wall may decrease between the first inner wall end and the terminal inner wall portion. The structural sections may include greater than about fifty percent (50%) of the perimeter, greater than about sixty percent (60%) of the perimeter, greater than about seventy percent (70%) of the perimeter, greater than about eighty percent (80%) of the perimeter, or greater than about ninety percent (90%) of the perimeter. The end may be connected to the side by a corner. A first number of the protruded features may be disposed along the end. A second number of the protruded features may be disposed along the side. In detail, the end may include a length of about thirty (30) inches and the first number of the protruded features may be nine (9) protruded features or another suitable number of protruded features. Additionally, the side may include a length of about seventy-two (72) inches and the second number of the protruded features may be twenty-three (23) protruded features or another suitable number of protruded features. The first number of the plurality of protruded features may be evenly or unevenly disposed along the end. Additionally or alternatively, the second number of the plurality of protruded features may be evenly or unevenly disposed along the side. Two or more of the first number of the protruded features disposed along the end may include rounded protruded features. Two or more of the second number of the protruded features disposed along the side may include rectangular protruded features.

Another aspect is a blow-molded plastic structure. The blow-molded plastic structure may include a body, a lip structure, a joint, one or more sides, one or more ends, and multiple depressions in the body. The body may include a first surface, a second surface, and at least one hollow interior portion of the body at least partially disposed between the first surface and the second surface. The lip structure may extend along at least a portion of a perimeter of the body and the lip structure may include a lip, sidewall, and/or edge. The lip structure may include multiple components such as an outer wall, an inner wall, structural portions, and protruded features. The outer wall may include an outer portion of the first surface and may extend in a first direction that may be substantially normal to the first surface and the second surface. The inner wall may include an outer portion of the second surface. The inner wall may be disposed in an inward direction relative to the outer wall. The structural portions may be disposed along structural sections of the perimeter. The structural portions may include first portions of the inner wall and first portions of the outer wall. The first portions of the outer wall may be disposed substantially parallel to the first portions of the inner wall and may be separated from the first portions of the inner wall by a first distance along the structural sections. The protruded features may be disposed between two structural portions of the structural portions. One or more of the protruded features may include second portions of the outer wall, which may extend substantially normal to the perimeter and second portions of the inner wall. The second portions of the inner wall may be separated from the second portions of the outer wall by a second distance that may be greater than the first distance. The second distance by which the second portions of the inner wall is separated from the second portions of the outer wall may decrease between the first inner wall end and the terminal inner wall portion. The body and the lip structure may be integrally formed as part of a unitary, one-piece structure. The joint may be disposed on the structural sections that connect the body to the lip structure. In detail, one or more of the protruded features may interrupt the joint, the inner wall and the outer wall may be integrated at the joint. The joint may include an exterior surface that may be substantially parallel to the first surface and the exterior surface may be displaced relative to first surface. Additionally, the outer wall may include a first outer wall end that may be disposed at the perimeter of the planar element and a terminal outer wall portion may be opposite the first outer wall end. The inner wall may include a first inner wall end that may be disposed at an inner surface of the planar element and a terminal inner wall portion may be positioned opposite the first inner wall end. The terminal inner wall portion of the inner wall and the terminal outer wall portion of the outer wall may be joined to form a lip end. The inner wall, the outer wall, the joint, and the lip end may at least partially define first cavities along the structural sections and second cavities disposed within one of the protruded features. The first cavities may be in fluid communication with the hollow interior portion via the second cavities. The unitary, one-piece structure may be formed using a blow-molding process. During the blow-molding process, a gas may flow from the hollow interior portion of the body, through the second cavities, and into the first cavities. The gas may have a sufficient pressure in the first cavities to form the lip structure during the blow-molding process. The structural sections may include greater than about fifty percent (50%) of the perimeter, greater than about sixty percent (60%) of the perimeter, greater than about seventy percent (70%) of the perimeter, greater than about eighty percent (80%) of the perimeter, or greater than about ninety percent (90%) of the perimeter. The end may be connected to the side by a corner. A first number of the protruded features may be disposed along the end. A second number of the protruded features may be disposed along the side. In detail, the end may include a length of about thirty (30) inches and the first number of the protruded features may be nine (9) protruded features or another suitable number of protruded features. Additionally, the side may include a length of about seventy-two (72) inches and the second number of the protruded features may be twenty-three (23) protruded features or another suitable number of protruded features. The first number of the plurality of protruded features may be evenly or unevenly disposed along the end. Additionally or alternatively, the second number of the plurality of protruded features may be evenly or unevenly disposed along the side. Two or more of the first number of the protruded features disposed along the end may include rounded protruded features. Two or more of the second number of the protruded features disposed along the side may include rectangular protruded features. The depressions may be defined in the second surface. The depressions may extend into the hollow interior portion. The depressions may be integrally formed during a molding process as part of a unitary, one-piece construction along with the planar element and the lip structure. The structure may include a tabletop, which may be sized and configured to nest with an adjacent table to reduce a height of a plurality of stacked tables in a nested configuration. The structure may also include an article of furniture, a picnic table, a component of a playground a component of a shed, a component of a chair, and the like.

A further aspect is a blow-molded plastic structure constructed using a blow-molding process. The blow-molded plastic structure may comprise a tabletop including an upper surface, a lower surface, and a hollow interior portion disposed between the upper surface and the lower surface of the tabletop; a lip extending downwardly relative to the lower surface of the tabletop, the lip including an outer surface and an inner surface; a first pair of adjacent risers, each riser of the pair of risers including a first portion connected to the lower surface of the tabletop and a second portion connected to the inner surface of the lip, each riser including a hollow interior portion in fluid communication with the hollow interior portion of the tabletop; an elongated tack-off extending between the first pair of adjacent risers, the elongated tack-off including a first end disposed at least proximate a first riser of the first pair of adjacent risers and a second end disposed at least proximate a second riser of the first pair of adjacent risers; a first gas flow pathway at least partially formed by the hollow interior portion of the tabletop and the hollow interior portion of the first riser; and a second gas flow pathway at least partially formed by the hollow interior portion of the tabletop and the hollow interior portion of the second riser.

Another further aspect of a blow-molded plastic structure is the elongated tack-off may be generally disposed between the tabletop and the lip; and the elongated tack-off may at least substantially prevent fluid flow between the tabletop and the lip. The elongated tack-off may have a length at least three times greater than a height of a riser of the first pair of adjacent risers. The hollow interior portion of each riser may be in fluid communication with a hollow interior portion of the lip. The first gas flow pathway may be at least partially formed by the hollow interior portion of the tabletop, the hollow interior portion of the first riser, and a first hollow interior portion of the lip. The second gas flow pathway may be at least partially formed by the hollow interior portion of the tabletop, the hollow interior portion of the second riser, and a second hollow interior portion of the lip. The first hollow interior portion of the lip and the second hollow interior portion of the lip may be in fluid communication.

Yet another further aspect is the tabletop, the lip, the first pair of adjacent risers, the elongated tack-off, the first gas flow pathway, and the second gas flow pathway may be integrally formed as part of a unitary, one-piece structure during the blow-molding process. A gas may flow in the first gas flow pathway and a gas may flow in the second gas flow pathway during the blow-molding process to form at least a portion of the lip. The blow-molded plastic structure may also include a second pair of adjacent risers with the first pair of adjacent risers disposed on a first side of the tabletop and the second pair of adjacent risers disposed on a second side of the tabletop. The first pair of adjacent risers may be part of a plurality of pairs of adjacent risers, the plurality of pairs of adjacent risers may comprise at least two pairs of adjacent risers disposed along a first side of the tabletop, at least two pairs of adjacent risers disposed along a second side of the tabletop, at least two pairs of adjacent risers disposed along a third side of the tabletop, and at least two pairs of adjacent risers disposed along a fourth side of the tabletop. In addition, if the tabletop includes a corner, the first riser of the first pair of adjacent risers may be disposed on a first side of the corner and the second riser of the first pair of adjacent risers may be disposed on a second side of the corner, and the elongated tack-off may extend along a radius of the corner between the first pair of adjacent risers. The tabletop may include a perimeter, the first pair of adjacent risers may be part of a plurality of pairs of adjacent risers, the elongated tack-off may have a length measured from a first end to a second end, the elongated tack-off may be part of a plurality of elongated tack-offs, an elongated tack-off may be disposed between each pair of adjacent risers, and a combined length of the plurality of elongated tack-offs may comprises a length that is greater than about fifty percent (50%) of the perimeter, greater than about sixty percent (60%) of the perimeter, greater than about seventy percent (70%) of the perimeter, greater than about eighty percent (80%) of the perimeter, greater than about ninety percent (90%) of the perimeter, or more.

A further aspect is a blow-molded plastic structure constructed using a blow-molding process. The blow-molded plastic structure may comprise a tabletop including an upper surface, a lower surface, and a hollow interior portion disposed between the upper surface and the lower surface of the tabletop; a lip extending downwardly relative to the lower surface of the tabletop, the lip including an inner surface and an outer surface; a plurality of risers, each riser of the plurality of risers connected to the lower surface of the tabletop and the inner surface of the lip, each riser including a hollow interior portion in fluid communication with the hollow interior portion of the tabletop; and a plurality of elongated tack-offs, an elongated tack-off of the plurality of elongated tack-offs disposed between adjacent risers of the plurality of risers.

Another further aspect is the hollow interior portion of the tabletop may be in fluid communication with the hollow interior portion of the riser during the blow-molding process, the hollow interior portion of the riser may be in fluid communication with a hollow interior portion of the lip during the blow-molding process; a gas flow pathway may be formed by the hollow interior portion of the tabletop, the hollow interior portion of the riser, and the hollow interior portion of the lip, and gas may flow within the gas flow pathway during the blow-molding process. A first end and a second end of the elongated tack-off may be disposed between adjacent risers, the first end of the elongated tack-off may be disposed at least proximate a first riser of the adjacent risers and the second end of the elongated tack-off may be disposed at least proximate a second riser of the adjacent risers. The elongated tack-off disposed between the adjacent risers may have a length generally equal to a distance separating the adjacent risers.

Yet another further aspect is a structural feature may be disposed between adjacent risers of the plurality of risers, and the structural feature may include a hollow interior portion in fluid communication with the hollow interior portion of the adjacent risers. The adjacent risers of the plurality of risers may be spaced generally an equidistance apart. The adjacent risers of the plurality of risers may be spaced generally an equidistance apart along at least a portion of a side of the tabletop and along at least a portion of an end of the tabletop. In addition, the tabletop may include a corner with a first end and a second end, an elongated depression of the plurality of elongated depressions may extend between the first end and the second end of the corner. The corner may include a first end, a second end and a radius, a first riser of a pair of adjacent risers may be disposed proximate the first end of the corner, a second riser of the pair of adjacent risers may be disposed proximate the second end of the corner, and an elongated depression of the plurality of depressions may extend along the radius of the corner and between the first riser and the second riser. Gas may flow during the blow-molding process from the hollow interior portion of the tabletop, through the hollow interior portions of the risers, and into one or more hollow interior portions of the lip.

A still further aspect is the length of the elongated tack-off may be two, three, four, five, six, or more times a width of the riser. The length of the elongated tack-off may also be two, three, four, five, six, or more times a height of the adjacent portion of the lip. In addition, the length of the elongated tack-off may be two, three, four, five, six, or more times the length of a traditional derision. Further, the elongated tack-off may have a length at least three times greater than a height of a riser of the first pair of adjacent risers.

Advantageously, the risers and elongated depressions may help create a lip that is high-strength, impact resistant, and aesthetically pleasing. In addition, in an exemplary embodiment, a relatively small number of risers may be required. For example, a tabletop with a width of about thirty (30) inches may include four (4) risers disposed along the width and a tabletop with a length of about seventy-tow (72) inches may include eight (8) or (10) risers along the length. It will be appreciated, after reviewing this disclosure, that the table may include any suitable number, size, shape, configuration, and/or arrangement of risers and elongated depressions depending, for example, upon the intended use of the table.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of exemplary embodiments to further illustrate and clarify the above and other aspects, advantages, and features of the present invention. It will be appreciated that these drawings depict only exemplary embodiments of the invention and are not intended to limit its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

DETAILED DESCRIPTION OF SOME EMBODIMENTS

Figure 1:
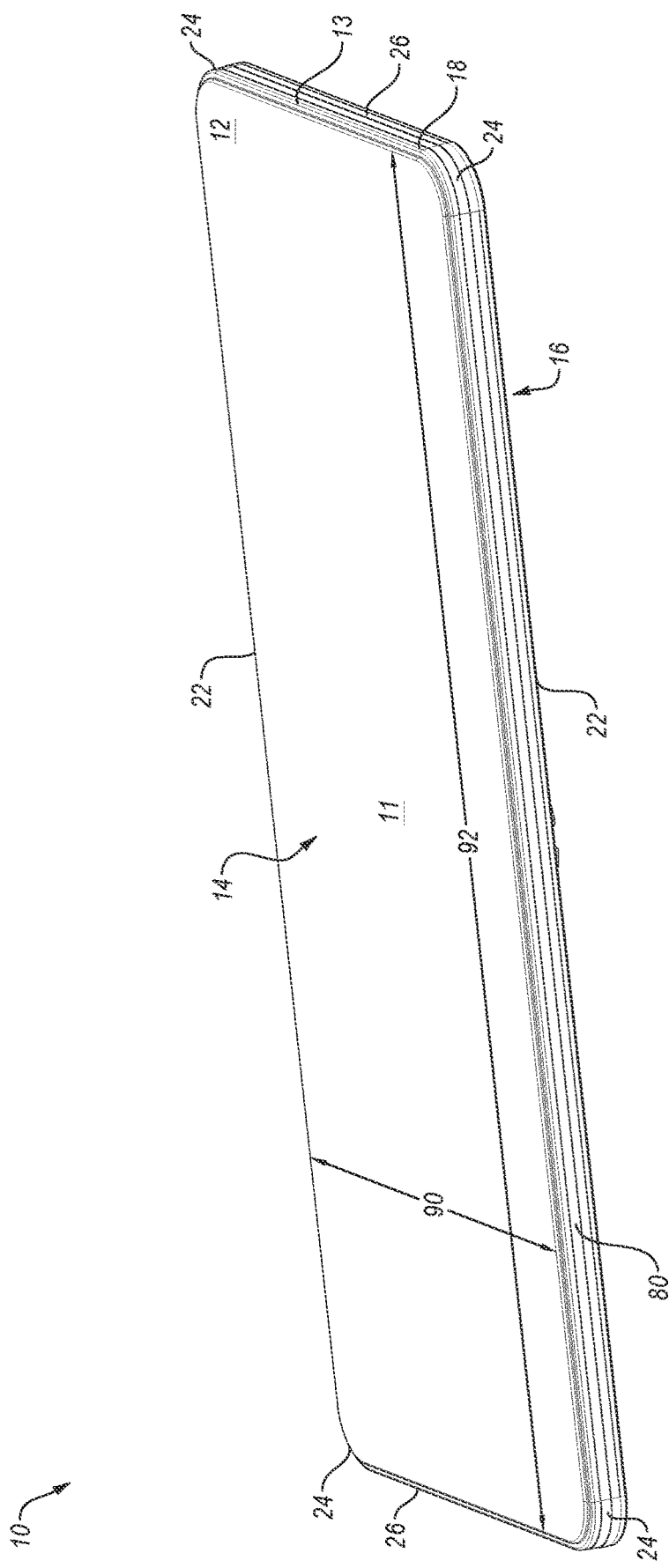
FIG. 1 is an upper perspective view of an exemplary table.

The following exemplary embodiments are generally described in connection with tabletops. The principles of the present invention, however, are not limited to tabletops. In particular, the principles of the present invention may be implemented in other articles of furniture and in other structures that include molded plastic components. In addition, it will be understood that, with the benefit of the present disclosure, the tabletops disclosed herein can have a variety of shapes, sizes, configurations, and arrangements. Moreover, while the tabletops shown in the accompanying figures may be configured for use in connection with banquet or utility tables, it will be appreciated the tabletops may have any suitable style or configuration. For instance, the tabletops described herein may be implemented in round tables, personal tables, conference tables, seminar tables, folding tables, recreation tables, adjustable height folding tables, card tables, and the like. Further, the invention disclosed herein and components thereof may be successfully used in connection with other types of furniture (e.g., chairs, stacking chairs, kid's chairs, benches, picnic tables, etc.) and/or structures (e.g., storage sheds, deck boxes, coolers, garden boxes, playground equipment, etc.).

To assist in the description of exemplary embodiments of the tabletops, words such as top, bottom, front, rear, right and left may be used to describe the accompanying figures which may be, but are not necessarily, drawn to scale. It will further be appreciated the tabletops can be disposed in a variety of desired positions or orientations, and used in numerous locations, environments, and arrangements. A detailed description of some exemplary embodiments of the tabletop now follows.

As shown in FIGS. 1-4, an exemplary table 10 may include a tabletop 12 that may be constructed from molded plastic. The tabletop 12 may include an upper portion 14, such as an upper surface; a lower portion 16, such as a lower or underneath surface or portion; and an outer boundary 18. As shown in the accompanying figures, a lip structure 13 may be disposed about the perimeter 15 and may extend downwardly from the lower portion 16 of the tabletop 12. The upper portion 14 may be spaced apart from the lower portion 16 of the tabletop 12 by a distance, which may be a generally constant distance in some embodiments. The tabletop 12 may also include a hollow interior portion disposed between the upper portion 14 and the lower portion 16 of the tabletop 12.

In addition, the tabletop 12 may further include one or more sides 22, corners 24, and ends 26. The tabletop 12, including the upper portion 14, the lower portion 16, the hollow interior portion, the lip structure 13, the sides 22, the corners 24, and/or the ends 26, may be integrally formed as part of unitary, one-piece structure during the molding process. If the tabletop 12 is constructed from plastic, it may be formed in the desired shape by blow-molding, injection molding, rotary molding, and/or other suitable processes. It will also be appreciated that the tabletop 12 may be constructed using various materials such as wood, metal and the like.

The tabletop 12 may include a generally planar portion or element 11. The generally planar element 11 may form at least a portion of the tabletop 12 such as an upper portion or surface 14 and/or a lower portion or surface 16. The lip structure 13 may be disposed about the perimeter 18. The lip structure 13 may extend around an entirety of the perimeter 15 of the tabletop 12 in the depicted embodiment. In other embodiments, the lip structure 13 may extend along one or more portions of the perimeter 18, which may be separated from one another. The lip structure 13 may also be spaced inwardly from the perimeter 15 and the lip structure 13 may be any structure disposed at an angle relative to the generally planar element 11. The lip structure 13 may extend outwardly and/or downwardly from the lower portion 16 of the tabletop 12. For example, the lip structure 13 may extend in a substantially normal direction from the lower portion 16 of the tabletop 12. In this exemplary configuration, when the tabletop 12 is oriented with the upper portion 14 facing up, the lip structure 13 may extend downwardly.

Figure 2:
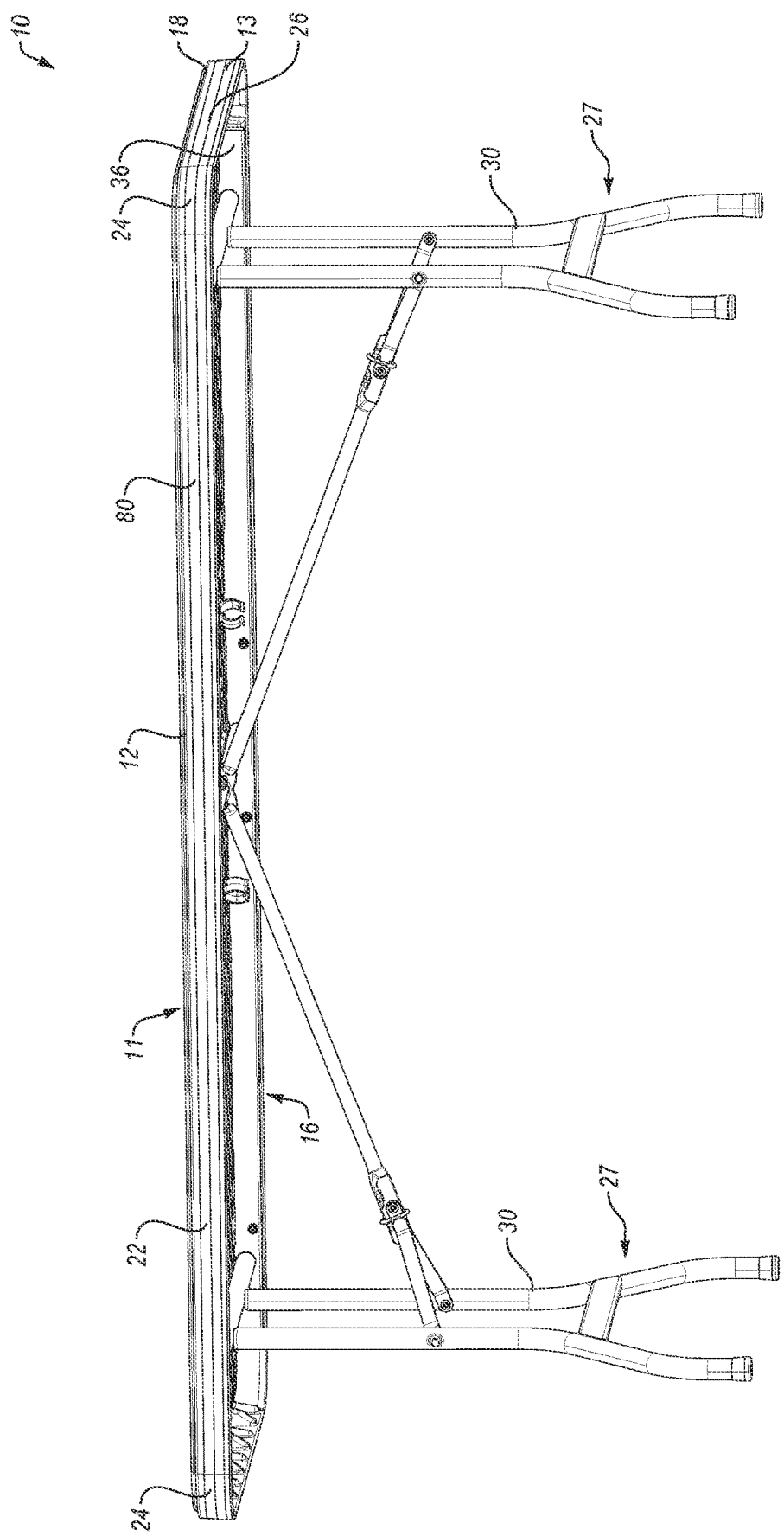
FIG. 2 is a lower perspective view of the top of FIG. 1 with support structures disposed in an extended configuration.
Figure 3:
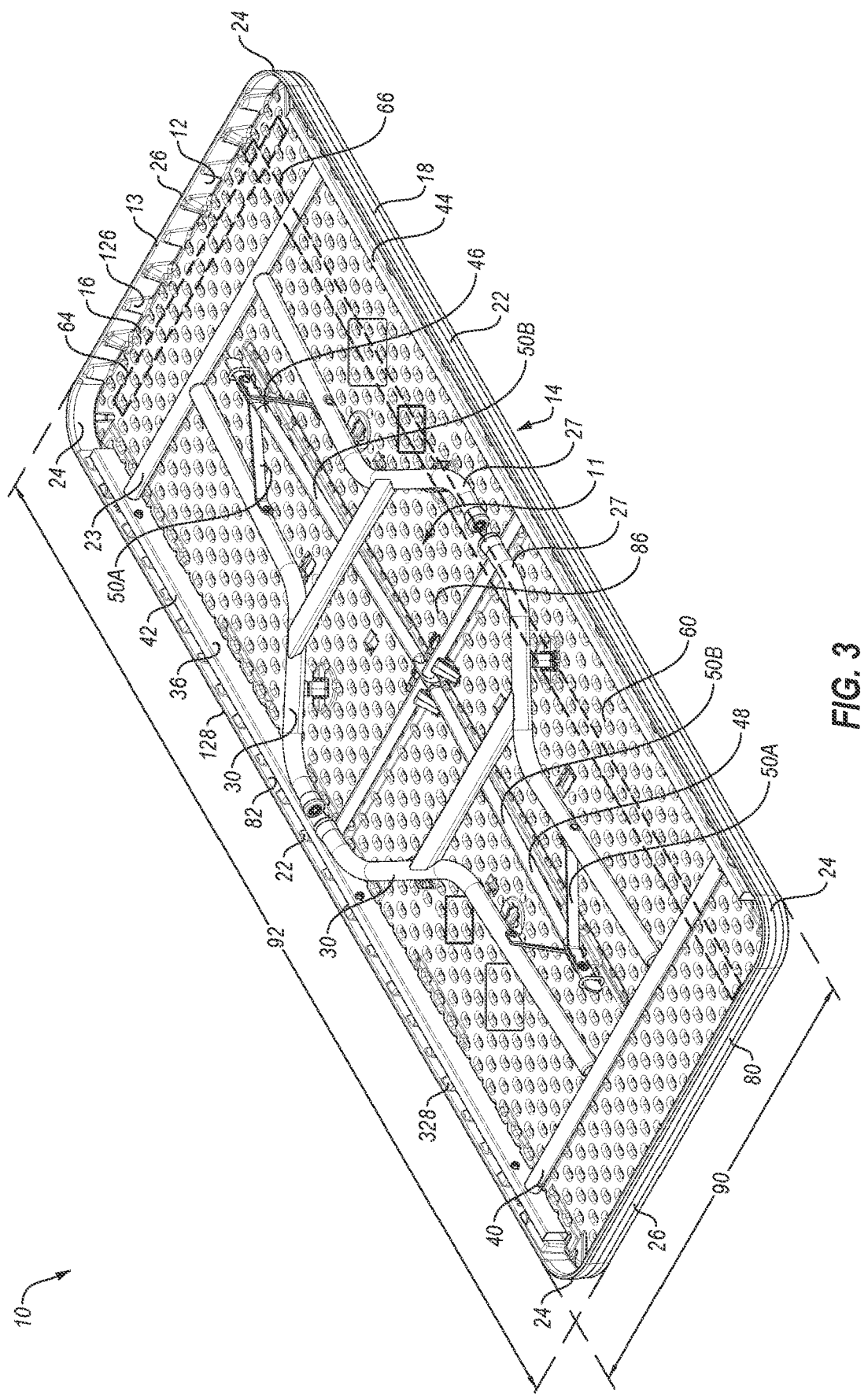
FIG. 3 is a perspective view of a lower view of the table of FIG. 1 with the support structures disposed in a collapsed configuration.

Referring to FIGS. 2 and 3, the table 10 may also include a one or more support structures 27, which may be sized and configured to support the tabletop 12 above a surface such as the floor or ground. The support structures 27 may include one or more legs or supports 30 and the support structures may be movable between an extended or use position and a collapsed or storage position relative to the tabletop 12. As shown in the accompanying figures, the support structures 27 may include a pair of legs or supports 30 and a connecting member may interconnect the supports.

The table 10 may include a frame 36 that is connected to the tabletop 12. The support structures 27 may be connected to the frame 36. In addition, the support structures 27 may be movably connected to the frame 36 to allow the legs 30 to move between an outwardly extending or use position and a collapsed or storage position. For example, the support structures 27 and/or legs 30 may include or be connected to cross members 23, 40 and the cross members 23, 40 may be connected to or may be part of the frame 36. The frame 36 may include elongated support members or side rails 42, 44 and the cross members 23, 40 may be connected to the side rails 42, 44. It will be appreciated that the cross members 23, 40 may also be part of the frame 36. The side rails 42, 44 may extend along a length 92 and/or a width 90 of the tabletop 12 and the side rails may help support the tabletop 12 and/or facilitate connection of the support structures 27 and/or cross members 23, 40 to the tabletop 12.

As depicted in FIG. 3, the support structures 27 and/or the legs 30 can be but do not have to be connected to the cross members 23, 40 or the frame 36. Instead, the support structures 27 and/or the legs 30 may be connected to any suitable portions of the table 10. It will also be appreciated that the table 10 may include any suitable number of support structures 27 and/or legs 30 depending, for example, upon the intended use of the table. It will also be appreciated that the tabletop 12, the support structures 27, and the legs 30 may have various sizes, shapes, configurations, and arrangements depending, for example, upon the intended use of the table 10. It will further be appreciated that the frame 36, the side rails 42, 44 and/or the cross members 23, 40 are not required; and the table 10 may have other components, features, aspects, characteristics and the like, if desired.

The table 10 may also include first and second brace assemblies 46, 48, which may be connected to the support structures 27. In particular, the brace assemblies 46, 48 may be connected to the legs 30 and may be sized and configured to allow the legs 30 to move between the use and storage positions. The brace assemblies 46, 48 may include a first portion 50A connected to the legs 30 and a second portion 50B connected to a cross member 52 and/or the tabletop 12. The first portion 50A and second portions 50B may be interconnected to form the brace assemblies 46, 48.

Figure 16:
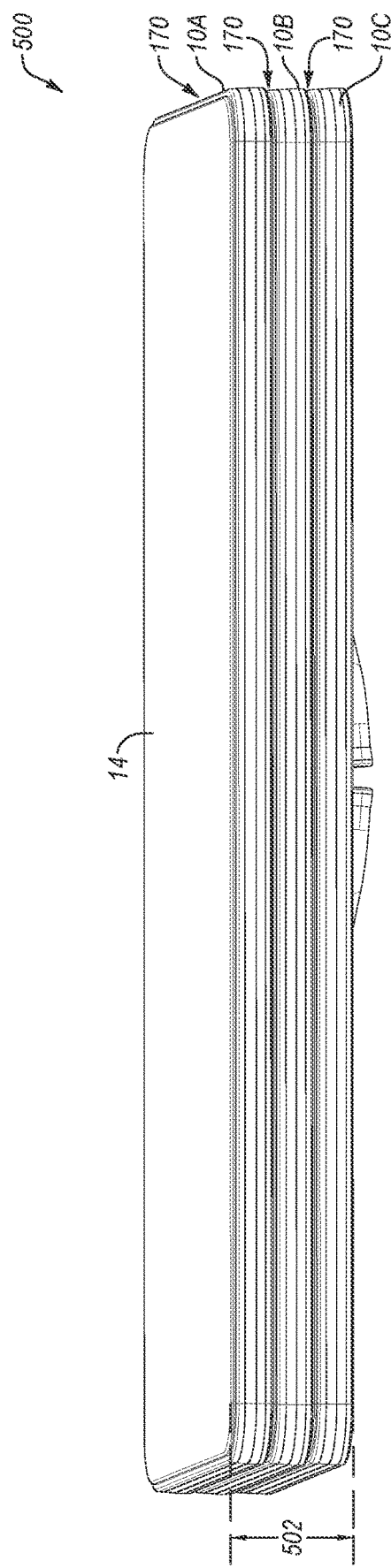
FIG. 16 depicts multiple embodiments of the table of FIG. 1 in an exemplary stacked configuration.

The table 10 may be sized and configured to be stacked with one or more additional tables. For example, FIG. 16 depicts multiple embodiments of the table 10 in a stacked configuration 500. In the stacked configuration 500, the stacked tables 10 are preferably nested together to reduce a height 502 of the tables 10 in the stacked configuration 500. Reduction in the height 502 may allow the tables 10 to be shipped, stored, and transported in a smaller volume. This may result in significant cost savings to the manufacturer, for example, because less storage space may be required and a substantial reduction in transportation costs may be achieved. An exemplary embodiment of nested tables is shown and described in U.S. Pat. No. 8,397,652, issued Mar. 19, 2012; U.S. Pat. No. 8,408,146, issued Apr. 2, 2013; U.S. Pat. No. 8,622,007, issued Jan. 7, 2014; U.S. Pat. No. 9,138,050 issued Sep. 22, 2015; and U.S. Pat. No. 8,347,795, issued Jan. 8, 2013; each of which are incorporated by reference in its entirety. Some additional details of the stacked configuration 500 are provided elsewhere in the present disclosure.

Referring back to FIG. 3, the frame 36 may be sized and configured to facilitate nesting of the tables 10. For example, the side rails 42, 44 of the frame 36 may be disposed along the sides 22 of the tabletop 12. Advantageously, if the side rails 42, 44 are disposed proximate the sides 22 of the tabletop 12, then the sides of the tabletop 12 may be supported by the frame 36, which may help create a strong and sturdy table 10. In addition, the side rails 42, 44 may be sized and configured to help transfer forces towards a center portion of the table 10 and away from the perimeter 15, which may also help create a strong and sturdy table 10.

Figure 4:
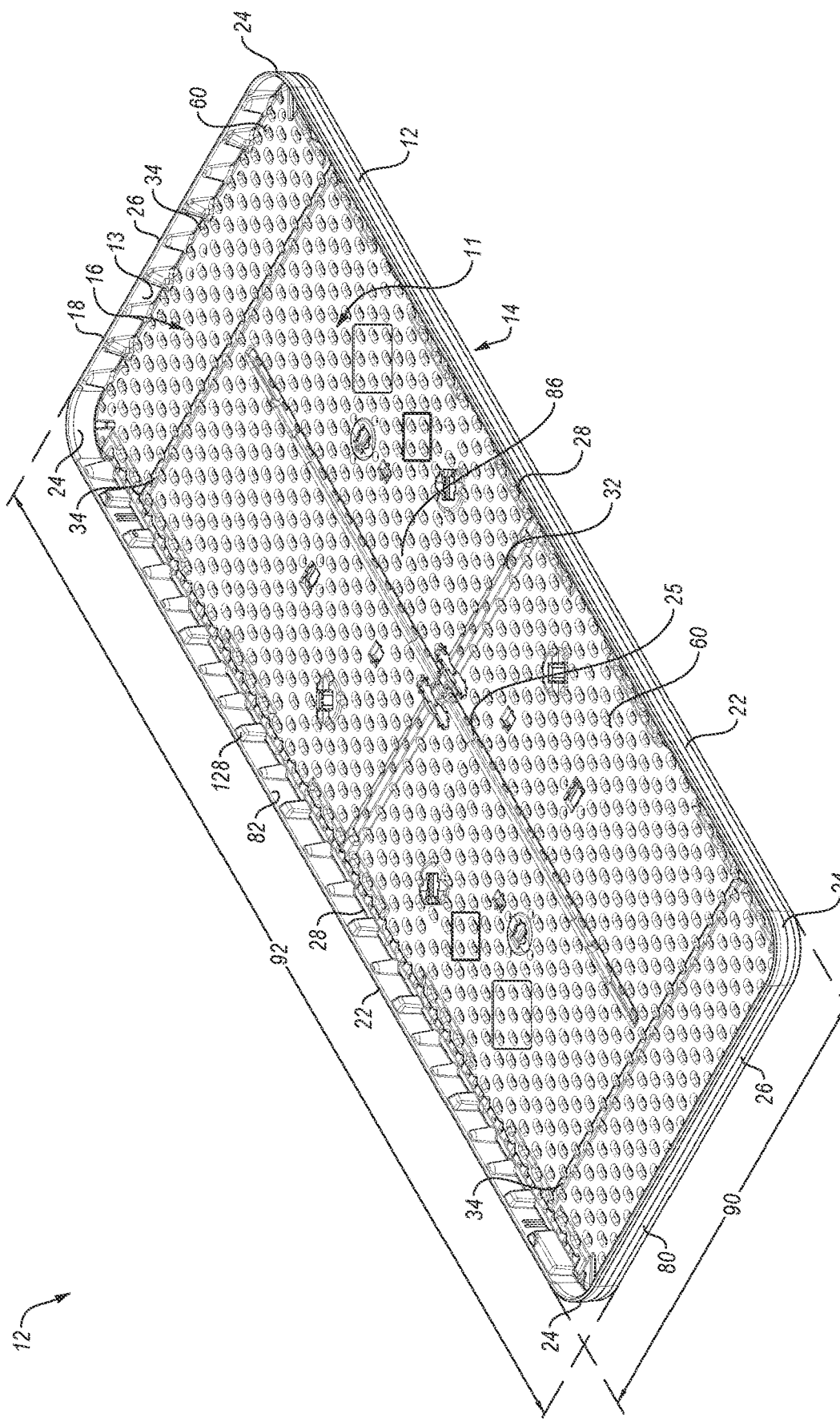
FIG. 4 is a perspective view of a lower view the table of FIG. 1 with support structures omitted.

With reference to FIGS. 3 and 4, the tabletop 12 may include one or more depressions 60, which may also be referred to as tack-offs. The depressions 60 may be sized, shaped, configured, and arranged to provide increased strength, stiffness, and/or rigidity to the tabletop 12. The depressions 60 may cover a majority, substantially all or the entirety of the lower portion 16 of the tabletop 12. In addition, the depressions 60 may have a generally uniform shape, size, configuration, and arrangement. The depressions 60 may further have an elongated shape that is aligned with an axis and the depressions 60 may be aligned in a series of rows and/or columns that extend along the length and/or width of the tabletop 12. Additionally, the depressions 60 in adjacent rows and columns may be offset, and the distance between adjacent depressions in the rows and columns may be generally the same. For example, the distance between adjacent depressions in each row and/or column may be generally constant or the same. The distance between adjacent rows and columns may also be generally constant or the same.

The depressions 60 may be used to create a tabletop 12 with generally uniform characteristics or qualities. For example, if the depressions 60 are consistently spaced, that may allow the upper portion 14 of the tabletop 12 to be uniformly supported. In addition, if the depressions 60 are separated by a generally constant distance, which may be measured from a center of one depression 60 to a center of an adjacent depression 60, that may create a tabletop 12 with more uniform characteristics or qualities. The distance between adjacent depressions 60 may be measured longitudinally, laterally, or at an angle depending, for example, upon the arrangement of the depressions 60.

The depressions 60 may also be disposed in a pattern and the depressions may be generally aligned and/or disposed in predetermined locations within the pattern. The pattern may include, for example, a number of rows 64 (see, e.g., FIG. 3) and/or columns 66 (see, e.g., FIG. 3) of depressions 60. The rows 64 may be disposed along a length 92 of the tabletop 12 and the columns 66 may extend along a width 90 of the tabletop 12. The depressions 60 may also be disposed in other suitable forms and patterns, and may have other shapes, sizes, configurations, and arrangements, depending, for example, upon the intended use of the tabletop 12.

The depressions 60 may also have different characteristics depending, for example, upon the particular configuration of the depressions. For example, the depressions 60 may have an elongated length and a depression may have increased strength along its length. The depression 60 may also have a non-circular configuration with increased strength in one direction in comparison to another direction. Advantageously, if the depressions 60 have different characteristics, then the depressions can be arranged or configured so the structure has certain characteristics. In particular, the depressions 60 may be arranged into a pattern to maximize certain characteristics and/or create a structure with generally uniform characteristics. For instance, the pattern may include generally uniformly spaced depressions 60 that are separated by a generally constant distance and/or disposed in standardized arrangement. A consistent arrangement of the depressions 60 may help create a structure with uniform characteristics. For example, a generally constant pattern of depressions 60 may create a structure with generally uniform strength and structural integrity.

With reference to FIG. 4, one or more of the depressions 60 may be disposed in one or more of the recesses 28, 25, 32, and/or 34. The depressions 60 in the recesses 28, 25, 32, and/or 34 may have generally the same size, shape, configuration, and/or arrangement as the depressions 60 in the pattern of remaining portions of the tabletop 12. The depressions 60 in the recesses 28, 25, 32, and/or 34 may also have other sizes, shapes, configurations, and/or arrangements depending, for example, upon the size of the recesses. Advantageously, the depressions 60 in the recesses 28, 25, 32, and/or 34 may help support the upper portion 14 of the tabletop 12. The depressions 60 in the recesses 28, 25, 32, and/or 34 may also help support portions of the tabletop 12 disposed proximate a frame (e.g., the frame 36 shown in FIG. 3), which may help prevent the tabletop 12 from undesirably sagging or otherwise deforming. The depressions 60 may also help prevent portions of the tabletop 12 from undesirably bending or collapsing if a load or force is applied to that portion of the tabletop 12.

The tabletop 12 may include longitudinal recesses 28, which may extend along one or more of the sides 22, and a central longitudinal recess 25. The longitudinal recesses 28 and 25 may be sized and configured to receive longitudinal portions or members of the frame (e.g., the side rails 42 and 44 described above).

Additionally, the tabletop 12 may include one or more central lateral recesses 32 and one or more lateral recesses 34. For example, a central lateral recess 32 may be disposed proximate a center portion of the tabletop 12 and lateral recesses 34 may be disposed proximate each of the ends 26 of the tabletop 12. The lateral recesses 32 and 34 may be configured to receive lateral portions or members of the frame 36.

The tabletop 12 and the recesses 28, 25, 32, and/or 34 may be sized to facilitate nesting of the tables 10 implementing the tabletop 12. For example, the recesses 28, 25, 32, and/or 34 may enable portions of a frame to be disposed at particular positions along the tabletop 12. The frame 36, for example, may be sized and configured transfer forces towards a central portion of the tabletop 12 and away from the perimeter 15 of the tabletop 12. The frame may also be sized and configured to support the sides 22, corners 24, and/or ends 26 of the tabletop 12. Additionally, the recesses 28, 25, 32, and/or 34 may help position the frame and/or support structures, and may facilitate stacking and/or nesting of the tabletop 12.

In some embodiments, the frame 36 and a support structure 27 that may be implemented in the tabletop 12 may include a frame and a support structure that is similar or substantially similar to that shown and described in U.S. Pat. No. 9,138,050 issued Sep. 22, 2015, which is incorporated herein by reference in its entirety. It will be appreciated with the benefit of the present disclosure that the tabletop 12 may be configured to be implemented with any suitable frame and/or support structures. It will also be appreciated with the benefit of the present disclosure that the frame and support structures may include any suitable components that may have various sizes, shapes, configurations, and arrangements depending, for example, upon the intended use of the tabletop 12. It will further be appreciated that a frame and/or a support structure are not required, and the tabletop 12 may be configured to be interfaced with other components, features, aspects, characteristics and the like, if desired.

Referring to FIGS. 3 and 4, as indicated above, the lip structure 13 may be disposed about or along at least a part of the perimeter 15 of the tabletop 12. The lip structure 13 may provide additional support to the corners 24, the sides 22, and/or the ends 26 of the tabletop 12. Advantageously, the lip structure 13 may increase the strength, rigidity, structural integrity, and/or impact resistance of the tabletop 12. The lip structure 13 may increase the life of the tabletop 12 and may reduce the likelihood that the tabletop 12 is damaged during use, shipping, and/or storage.

For instance, the table 10 may be constructed and then shipped to a retailer or end user. During the shipping process, the table 10 may be dropped or may contact other products. Such contact may impose forces on the tabletop 12 and, in particular, to edge portions of the tabletop 12. The lip structure 13 may be configured to strengthen the tabletop 12, which may reduce or prevent damage to the table 10. The lip structure 13 may also help reduce or prevent damage during use. For example, the tabletop 12 may be included in a banquet table that may be configurable in a storage arrangement and a use arrangement. Between uses, the banquet table may be configured in a storage arrangement and stored. At the next use, the banquet table may be retrieved and reconfigured in a use arrangement. During this use pattern, the banquet table may be dropped, tipped on its side, stuffed into a storage closet, etc., which may result in contact between the tabletop 12 and various items (e.g., the floor, closet doors, other tables, etc.). The lip structure 13 may reduce instance of this contact resulting in damage to the tabletop 12.

The tabletop 12 may include one or more protruded features 126 and 328. The protruded features 126 and 328 may be at least partially disposed in the lip structure 13. For example, the lip structure 13 may include one or more of the protruded features 126 along the ends 26 and one or more protruded features 328 along the sides 22 (collectively, protruded features 126/328). The protruded features 126 and/or 328 and structural features 128 may be disposed in a particular configuration and/or arrangement. For example, one or more structural features 128 may be positioned or disposed between each set of two of the protruded features 126/328.

In an exemplary embodiment, the lip structure 13 may include an outer wall 80 that is disposed about at least part of the perimeter 15 of the tabletop 12. In greater detail, the outer wall 80 may extend about the perimeter 15 and the outer wall 80 may be oriented substantially normal or perpendicular to the generally planar element 11, such as the upper portion 14 or the lower portion 16 of the tabletop 12. The protruded features 126 and/or 328 and structural features 128 may be generally aligned and/or disposed parallel to the outer wall 80.

The lip structure 13 may include an inner wall 82 that may be disposed generally parallel or at an angle relative to the outer wall 80. At least a portion of the inner wall 82 and the outer wall 80 may be separated by a spaced or a gap. In particular, a hollow interior portion may be at least partially disposed between the inner wall 82 and the outer wall 80, and the hollow interior portion may be formed during the molding process. In particular, the hollow interior portion at least partially disposed between the inner wall 82 and the outer wall 80 during a blow-molding process. The protruded features 126 and/or 328 and structural features 128 may be at least partially formed or disposed in the inner wall 82 and/or the outer wall 80. For example, the protruded features 126 and/or 328 may be at least partially formed or disposed in the inner wall 82 and generally aligned with the outer wall 80. The structural features 128 may also be at least partially formed or disposed in the inner wall 82 and/or the outer wall 80. For instance, the structural features 128 may be at least partially formed or disposed in the inner wall 82 and generally aligned with the outer wall 80.

In an exemplary embodiment, the structural features 128 may form a portion of the inner wall 82. The structural features 128 and/or the inner wall 82 may be disposed substantially normal to the generally planar element 11 and/or substantially parallel to the outer wall 80. The protruded features 126/328 and/or the inner wall 82 may be disposed inwardly relative to the outer wall 80. For instance, the protruded features 126/328 may extend towards a central portion 86 of the tabletop 12.

The structural features 128, which may form a portion of the lip structure 13 and may be at least partially formed by the inner wall 82 and the outer wall 80. At least a portion of the inner wall 82 and the outer wall 80 may be spaced apart by a distance. Thus, a gap or hollow interior portion may be disposed between the inner wall 82 and the outer wall 80. The inner wall 82 and the outer wall 80 may be disposed in a generally parallel configuration and/or at an angle relative to one another.

For example, if the inner wall 82 and the outer wall 80 are disposed in a generally parallel configuration, a lower or bottom wall may connect the inner and outer walls. The inner wall 82 and the outer wall 80 may also touch or contact, which may form a compression edge. Thus, in an exemplary embodiment, a portion of the inner wall 82 and the outer wall 80 may contact, and a portion of the inner wall 82 and the outer wall 80 may be separated by a gap or spaced apart by a distance. The gap or distance between the inner wall 82 and the outer wall 80 may form a hollow interior portion such as a volume or cavity. Advantageously, the inner and outer walls 80 and 82 may be disposed in close proximity. For example, the inner and outer walls 80 and 82 may be spaced apart by about 5 mm (0.2 in.) or less, such as about 4 mm (0.16 in.), about 3 mm (0.12 in.), about 2 mm (0.08 in.); about 1 mm (0.04 in.), about 0.5 mm (0.02 in.), or less. The two walls 80 and 82 may provide additional rigidity to forces that act on the lip structure 13 and/or the structural features 128. In addition, the two walls 80 and 82 of the lip structure 13 and/or the structural features 128 may provide additional rigidity, such as to forces acting inwardly (e.g., towards the central portion 86) or outwardly (e.g., away from the central portion 86).

The structural features 128 may form at least a portion, such as a majority of the lip structure 13. For example, the lip structure 13 may extend around the entirety of the perimeter 18. For instance, the tabletop 12 may be an eight-foot banquet table that has the length 92 of about eight (8) feet and the width 90 of about thirty (30) inches. Accordingly, the perimeter 15 may be about 252 inches. A portion of the perimeter 15 on which the structural features 128 may be disposed or at least partially defined may be greater than about fifty percent (50%) of the perimeter 18, greater than about sixty percent (60%) of the perimeter 18, greater than about seventy percent (70%) of the perimeter 18, greater than about eighty percent (80%) of the perimeter 18, or greater than about ninety percent (90%) of the perimeter 18.

It will be understood the tabletop 12 may have different shapes, sizes, configurations and/or arrangements depending, for example, upon the intended use of the table 10. It will also be understood that the table 10 and tabletop 12 and may include any suitable number and combination of features, aspects, and components; but none of the features, aspects or components may be required. In addition, it will be understood that the structural features 128 may have a particular size, shape, configuration, and/or arrangement to provide, for example, increased strength, rigidity, and/or structural integrity. It will be further understood that the structural features 128 may have a specific size, shape, configuration and/or arrangement depending, for example, upon factors such as location, intended use, function and the like.

In the following paragraphs, the lip structure 13 is described with reference to the tabletop 12. It will be appreciated, however, that the lip structure 13 is not limited to implementation with the tabletop 12. Instead, the lip structure 13 may be implemented in various structures, which may include round tables, personal tables, conference tables, seminar tables, folding tables, recreation tables, adjustable height folding tables, card tables other types of furniture (e.g., chairs, stacking chairs, kids chairs, benches, picnic tables, etc.) and/or structures (e.g., storage sheds, deck boxes, coolers, garden boxes, playground equipment, etc.).

Figure 5:
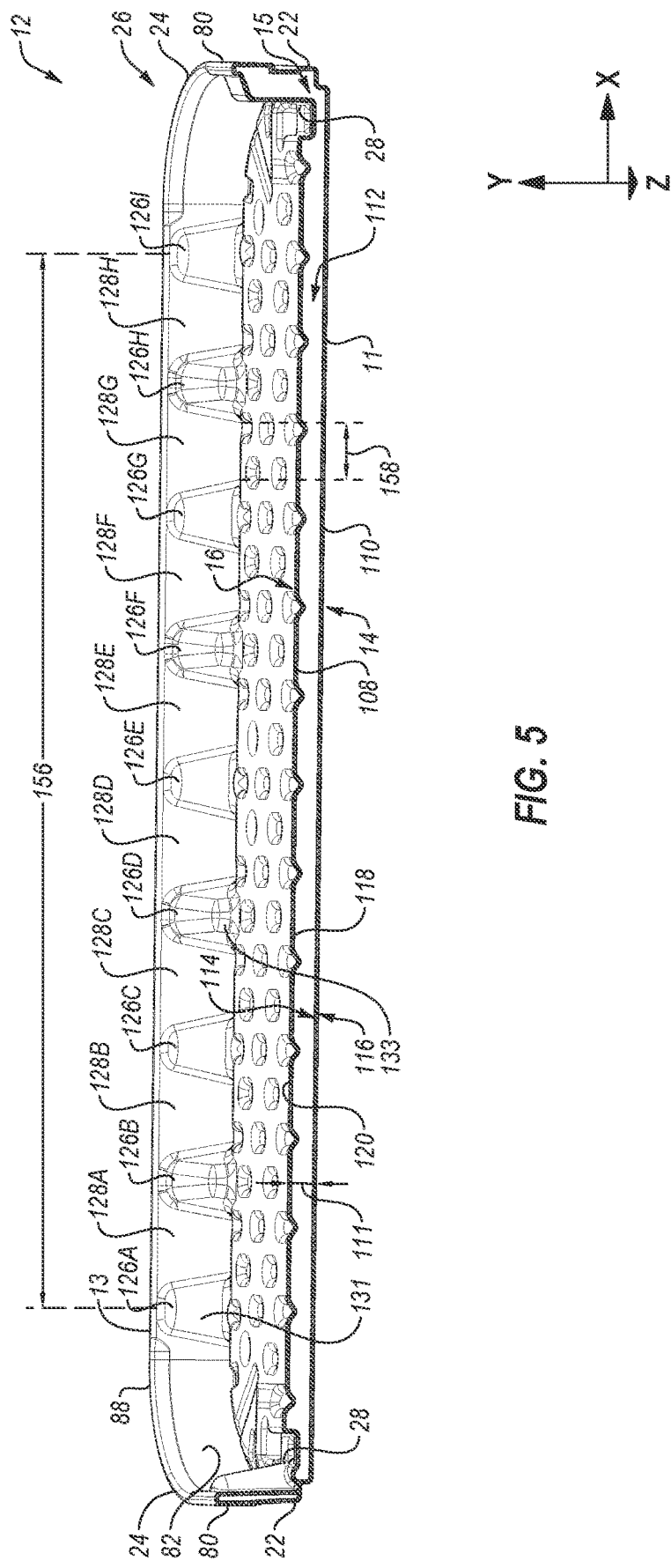
FIG. 5 is an enlarged view of a portion of an exemplary tabletop of the table of FIG. 1.

FIG. 5 depicts a portion of the tabletop 12. The portion of the tabletop 12 in FIG. 5 depicts one of the ends 26, two of the corners 24, a portion of the generally planar element 11, a portion of the sides 22, and a portion of the lip structure 13 that extends about the end 26, the corners 24 and the portions of the sides 22. As discussed above and as shown in FIG. 5, the lip structure 13 may extend outwardly (e.g., in the y-direction) from the substantially planar element 11 of the tabletop 12. The lip structure 13 may be disposed about at least a part of the perimeter 15 and the lip structure 13 may be disposed generally perpendicular to the upper portion 14 and the lower portion 16 of the tabletop 12.

In other embodiments, the lip structure 13 may not be disposed at an angle relative to the perimeter 15 and may be spaced inwardly from the perimeter 18. Additionally, in some embodiments, the lip structure 13 may extend about only a portion of the perimeter 15 the tabletop 12. Thus, for example, the tabletop 12 may include a plurality of lip structures 13 and the lip structures may be spaced apart, aligned, disposed at angles, and the like depending, for example, upon the size, shape, configuration and/or arrangement of the tabletop 12.

The generally planar element 11 may extend in the z-direction of the arbitrarily defined coordinate system of FIG. 5. The generally planar element 11 may be substantially oriented in a first plane that is oriented substantially parallel to the XZ plane of FIG. 5. The generally planar element 11 may include or may be generally aligned with a first layer 110 of material and a second layer 108 of the material. The first layer 110 may include a first inner surface 114 and a first outer surface 116. The second layer 108 may include a second inner surface 118 and a second outer surface 120. The first outer surface 116 may form an upper surface of the tabletop 12. In these and other embodiments, the second outer surface 120 may form a bottom surface or underneath portion (e.g., facing the floor when in use) of the tabletop 12. The first layer 110 may be positioned relative to the second layer 108 such that one or more hollow interior portions 112, such as volumes, chambers, or spaces, are disposed or defined between at least a portion of the first inner surface 114 of the first layer 110 and the second inner surface 118 of the second layer 108.

As introduced above, the generally planar element 11 may include one or more depressions 60. The depressions 60 may be defined or formed in the second outer surface 120. The depressions 60 may extend into at least some or a portion of the volumes 112. For instance, in the depicted embodiment, the depressions 60 extend at least a part of a distance 111 to the first inner surface 114. For example, the depressions 60 may extend about fifty percent (50%) of the distance 111 to the first inner surface 114, about sixty percent (60%) of the distance 111 to the first inner surface 114, about seventy percent (70%) of the distance 111 to the first inner surface 114, about eighty percent (80%) of the distance 111 to the first inner surface 114, about ninety percent (90%) of the distance 111 to the first inner surface 114, etc. In some embodiments, the depressions 60 may extend into the volume 112 such that the second inner surface 118 contacts the first inner surface 114. In addition, the generally planar element 11 may include or define one or more other recesses or volumes, such as those described above. For instance, the generally planar element 11 may include or define the recesses 28 in which a frame (e.g., the frame 36 shown in FIGS. 1-4) of a table (e.g., the table 10 shown in FIGS. 1-4), a portion thereof, a leg of a table, etc. may be disposed and/or retained. One or both of the recesses 28 may extend into the volume 112 or may be configured such that the second inner surface 118 at the recesses 28 contact the first inner surface 114.

The lip structure 13 may extend around an entirety of the perimeter 15 of the generally planar element 11 or around one or more portions of the perimeter 15. The portions may be separated by another lip structure that includes one or more differing characteristics. For instance, in some embodiments, the tabletop 12 may include the lip structure 13 along the ends 26 and a lip structure similar to that described in U.S. Pat. No. 9,138,050, which is incorporated by reference in its entirety, along the sides 22. In other embodiments, other lip structures may be implemented between portions of the lip structure 13, which may be determined by the function or intended uses of the component on which the lip structure 13 is implemented.

The lip structure 13 may extend in a substantially normal direction to the first plane. For example, as shown in FIG. 2, the lip structure 13 may extend in substantially the y-direction relative to the first plane.

As shown in FIG. 5, the lip structure 13 may include two or more protruded features 126A-126I (generally, protruded feature 126 or protruded features 126) and one or more structural features 128A-128H (generally, structural feature 128 or structural features 128). The protruded features 126 and the structural features 128 may at least partially form and/or be disposed in the lip structure 13. The protruded features 126 and/or structural features 128 may be disposed in a pattern or arrangement. For example, two or more protruded features 126 may be separated from one another. The structural features 128 may be positioned or disposed between the protruded features 126.

The structural features 128 may be sized and configured to support and structurally strengthen the lip structure 13. For example, in some embodiments, the structural features 128 may include portions of the outer wall 80 and the inner wall 82 (described additionally below) that are positioned in close proximity to one another and may be disposed substantially parallel to one another. Close proximity may be used to describe a distance between at least a portion of the inner wall 82 and at least a portion the outer wall 80, which may be less than about 1.5 mm, less than about 1.0 mm, less than about 0.5 mm, or another suitable distance. In another embodiment, all or a portion of the inner wall 82 and the outer wall 80 may be joined. For example, the inner wall 82 and the outer wall 80 may be joined at the bottom edge 88. If the inner wall 82 and the outer wall 80 are joined, a compression edge may be formed. If desired, all or a portion of the inner wall 82 and the outer wall 80 may be disposed in close proximity or may be joined. Accordingly, the structural features 128 may include two walls 80 and 82 that are disposed in close proximity to one another, at least partially joined (such as at the bottom edge 88), or partially disposed in close proximity and partially joined. The two walls 80 and 82 may provide improved strength relative to other edges and lip structures constructed with a single wall and relative to other edges and lip structures with walls 80 and 82 that are separated farther from one another.

The tabletop 12 or another structure implementing the lip structure 13 may be blow-molded. For example, the tabletop 12 or the other structure may be produced by a blow-molded process in which the tabletop 12 or the other structure is created as a single unitary structure or a single unitary piece. In these embodiments, the protruded features 126 may enable formation of the structural features 128. For example, to mold the structural features 128 in a blow-molded process, the plastic may be forced by a pressure (e.g., about eighty (80) pounds per square inch (PSI)) into a mold. In the blow-molded process, there is a limit to which the walls 80 and 82 of the structural features 128 may be positioned relative to one another (e.g., within the close proximity) and joined at one or more ends without the inner surfaces undesirably touching, becoming joined to one another, and potentially isolating portions of structural features 128 from the pressure. For example, while it may be desirable for the walls 80 and 82 to touch to form a compression edge, failure may result if other portions of molded plastic undesirably touch or join during the blow-molded process.

For instance, without the protruded features 126 along a length (e.g., in the x direction), a portion of the outer wall 80 may undesirably contact the inner wall 82 at some point (perhaps near the left corner 24). The contact between the walls 80 and 82 may seal a remaining portion of the structural feature 128 and may prevent or substantially prevent the gas from enter the remaining portion or may undesirably reduce the pressure of the gas. The lack of gas and/or gas pressure may create voids, inconsistencies, etc., in the structural feature 128. The voids, inconsistencies, etc., may reduce structural integrity of the lip structure 13 and may affect an appearance of the lip structure 13. The lack of gas and/or gas pressure may also prevent the tabletop 12 from being formed correctly. For example, the tabletop 12 may include one or more defects and that may prevent the use of the tabletop 12. That is, the gas or the pressure of the gas may not be sufficient to form a portion of the tabletop 12, which may lead to the tabletop 12 being defective. The protruded features 126, however, may allow the structural features 128 to be correctly formed because the protruded features may, for example, allow gas at a suitable pressure to form the structural feature during the blow-molding process. In the illustrated embodiment, the lip structure 13 may include the protruded features 126 positioned between the structural features 128. The protruded features 126 may assist or provide a channel or pathway via which the gas at a suitable pressure is supplied to the structural features 128.

The portion of the lip structure 13 between a first protruded feature 126A and a fourth protruded feature 126D depicted in FIG. 5 includes an overall length, which is represented in FIG. 5 by reference number 156. The structural features 128 may be disposed along a first portion of the overall length 156 and the protruded features 126 may be disposed along a second portion of the overall length 156. The first portion may constitute a substantial portion or a majority of the overall length 156. For instance, the first portion may be greater than about fifty percent (50%) of the overall length 156, greater than about sixty percent (60%) of the overall length 156, greater than about seventy percent (70%) of the overall length 156, greater than about eighty percent (80%) of the overall length 156, or greater than about ninety percent (90%) of the overall length 156.

Additionally, a distance 158 between the protruded features 126 may correspond to a length of the structural features 128. The distance 158 between the protruded features 126 may be substantially equal, if desired. Alternatively, the distance 158 between the protruded features may vary, such as along the lip structure 13. For example, the lip structure 13 may include a first distance (e.g., 158) and a second distance (e.g., 158) that is different from the first distance. The distance 158 may be about 1 inch, about 2 inches, about 3 inches, about 4 inches, about 5 inches, about 6 inches, about 7 inches, about 8 inches, or another suitable distance. In each of these embodiments, a sum of the distances 158 between the protruded features 126 may be greater than the second portion of the overall distance 158 that is made up of the protruded features 126.

The protruded features 126 may include multiple geometries. For instance, in the depicted embodiment, the protruded features 126 may include two geometries. A first geometry, which may be implemented in a first subset of the protruded features 126 (e.g., 126A, 126C, 126E, 126G, and 126I), may be a rounded geometry. For instance, an outer surface 131 may be curve from a first side to a second side of the protruded feature 126. Additionally, the rounded geometry may include a width (e.g., a dimension in the x direction) that is more narrow at the top (having a greater y dimension) than at the bottom (having a lower y dimension).

A second geometry, which may be implemented in a second subset of the protruded features 126 (e.g., 126B, 126D, 126F, and 126H), may be an angular geometry. For instance, an outer surface 133 may be angled towards the bottom edge 88 and may be angled between a first side and a second side of the protruded feature 126. Additionally, the angular geometry may include a width (e.g., a dimension in the x direction) that is more narrow at the top (having a greater y dimension) than at the bottom (having a lower y dimension).

In the depicted embodiment, every-other protruded feature 126 may include the angular geometry. In other embodiments, every third protruded feature 126, every fourth protruded feature 126, etc. may include the angular geometry. Moreover, in some embodiments, all of the protruded features 126 may include the angular geometry, curved geometry, or other suitable geometry.

Figure 6:
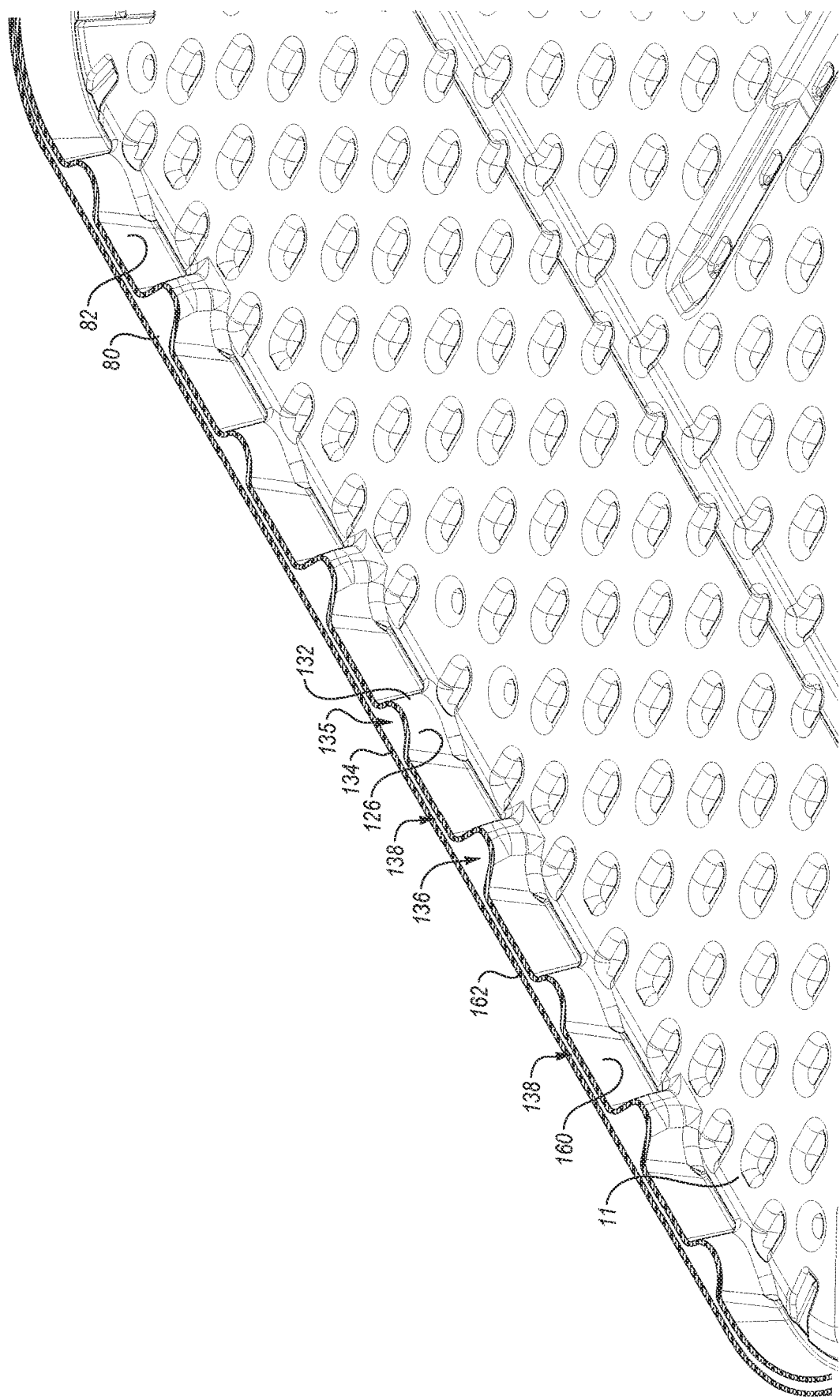
FIG. 6 is an enlarged, sectional view of a portion of the tabletop of the table of FIG. 1.
Figure 7:
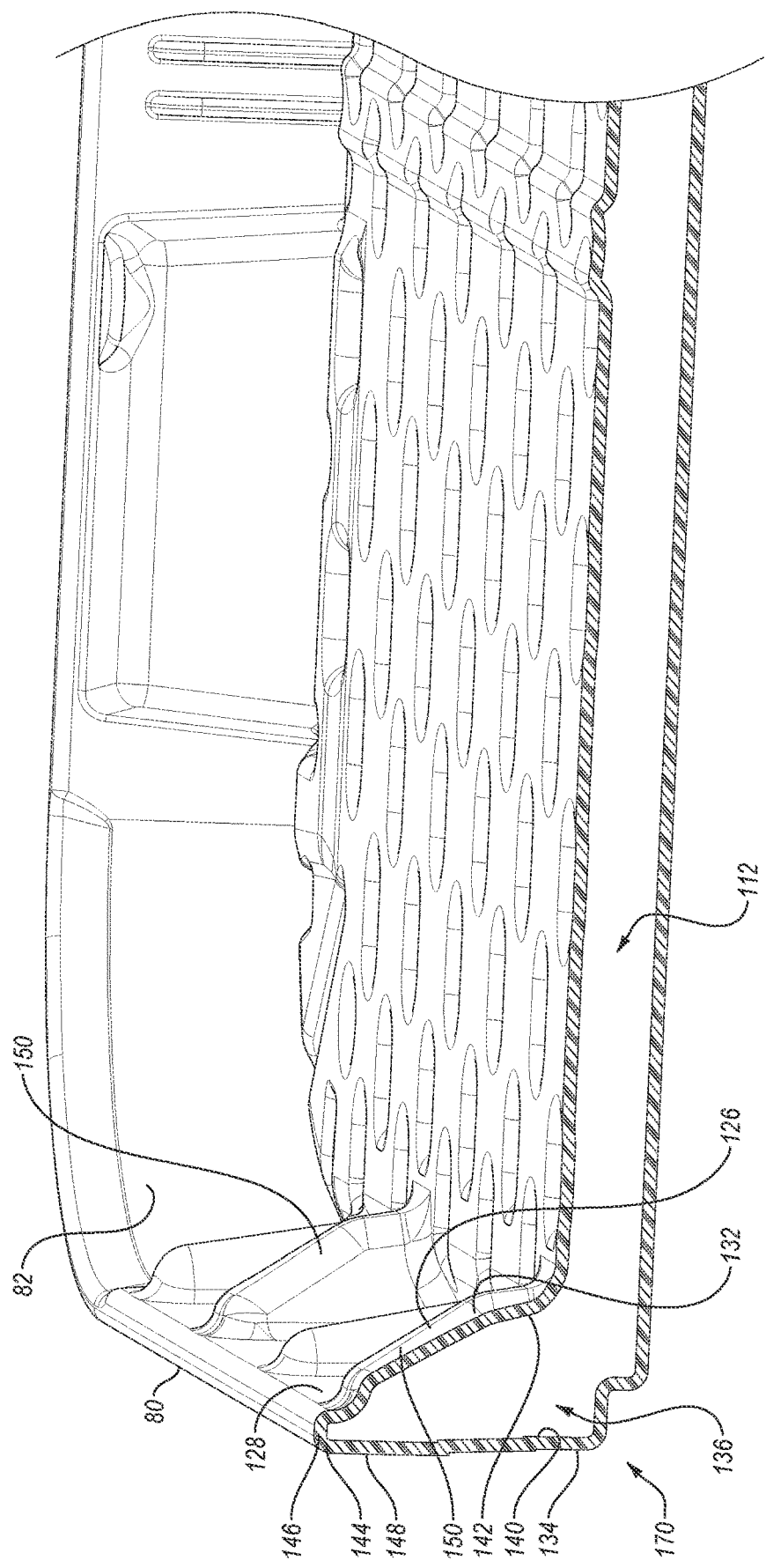
FIG. 7 depicts a sectional view of one of the protruded features that implements an angled geometry that may be implemented in the tabletop of the table of FIG. 1.
Figure 9:
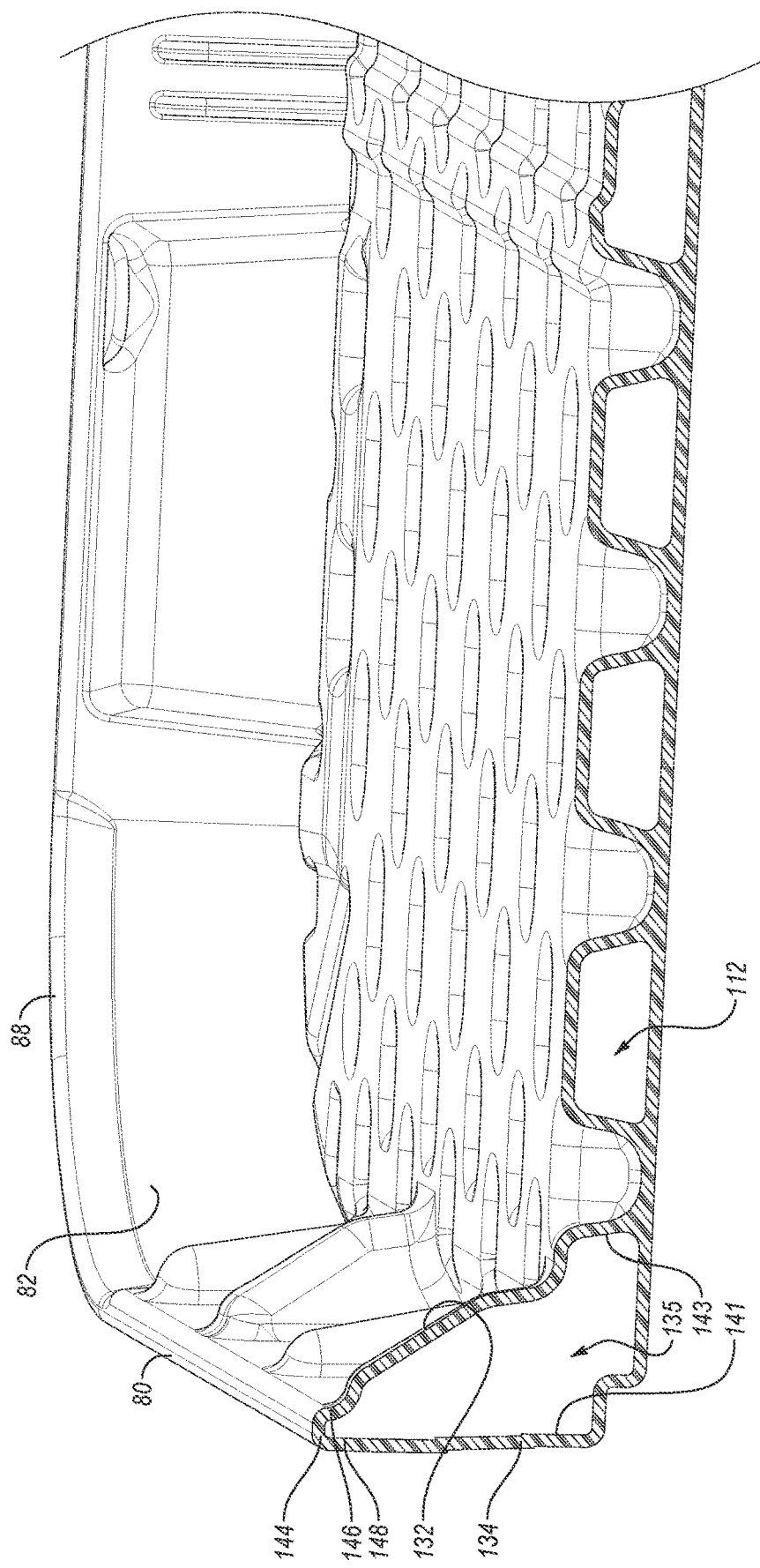
FIG. 9 depicts a sectional view of one of the protruded features that implements a curved geometry that may be implemented in the tabletop of the table of FIG. 1.

FIGS. 6, 7, and 9 depict exemplary embodiments of a portion of the tabletop 12, such as the lip structure 13 and the protruded features 126. In particular, the sectioning plane in FIG. 6 is substantially parallel to the first plane (parallel to the XZ plane of FIG. 5) of the generally planar element 11. FIGS. 7 and 9 depict sectional views of the protruded features 126. FIG. 7 depicts a sectional view of one of the protruded features 126 that implements the angular geometry. FIG. 9 depicts a sectional view of one of the protruded features that implements the curved geometry. The sectional views of FIGS. 7 and 9 are perpendicular to the sectional view of FIG. 6. In FIGS. 6, 7, and 9 not every instance of every feature is labelled for clarity and ease of reference. It will be appreciated with the benefit of the present disclosure that like features may include like function and structure.

With reference to FIGS. 6, 7, and 9, the protruded features 126 may include an inner wall portion 132 and an outer wall portion 134. The inner wall portion 132 may be formed from a portion of the inner wall 82 and the outer wall portion 134 may be formed from a portion of the outer wall 80. As shown in the accompanying figures, the inner wall portion 132 may be positioned or spaced apart from the corresponding outer wall portion 134. For example, the inner wall portion 132 may extend inwardly to form an interior space such as a first cavity 136 of FIGS. 6 and 7 or a third cavity 135 of FIGS. 6 and 9.

With reference to FIG. 7, the first cavity 136 may be at least partially formed or defined between an inner surface 140 of the corresponding outer wall portion 134 and an inner surface 142 of the inner wall portion 132. Similarly, the third cavity 135 may be at least partially formed or defined between an inner surface 141 of the corresponding outer wall portion 134 and an inner surface 143 of the inner wall portion 132.

The first cavity 136 may extend and/or be in fluid communication with one or more of the volumes 112 in the generally planar element 11. Additionally, the first cavity 136 may be in fluid communication a second cavity 138 (FIG. 6 and FIG. 8) and the second cavity 138 may be in fluid communication with the one or more volumes 112. Additionally still, the first cavity 136 may extend and/or be in fluid communication with the third cavity 135, which may be in fluid communication with the second cavity 138 and/or the volumes 112. Thus, gas may flow through the volumes 112 and into the cavities 136, 135, and 138 of the protruded features 126 during the molding process. Gas may also flow through the cavities 136, 135 and 138 and into the structural features 128 during the molding process. Advantageously, a sufficient amount of gas at an appropriate pressure may flow through the protruded features 126 to allow the structural features 128 to form during the molding process. Additionally, pressure or some portion thereof imposed in the first cavity 136 during a molding process may be routed to the second cavity 138. The pressure may be supplied via the volume 112 and/or via other protruded features 126.

The protruded features 126 may include a connecting portion or bottom surface, such as an end 144. The end 144 may be formed by a terminal portion 148 of the outer wall portion 134 and a terminal portion 146 of the inner wall portion 132. The terminal portion 148 of the corresponding outer wall portion 134 may be molded with the terminal portion 146 of the inner wall portion 132 to create a structure at the bottom edge 88. The terminal portions 146 and/or 148 may include about forty-five percent (45%) of the corresponding outer wall portion 134 and/or the inner wall portion 132, about thirty-five percent (35%) of the corresponding outer wall portion 134 and/or the inner wall portion 132, about twenty-five percent (25%) of the corresponding outer wall portion 134 and/or the inner wall portion 132, about fifteen percent (15%) of the corresponding outer wall portion 134 and/or the inner wall portion 132, about five percent (5%) of the corresponding outer wall portion 134 and/or the inner wall portion 132, or less. The end 144 may include a rounded external surface and the end may be aligned with the bottom edge 88.

In the embodiment shown in FIG. 7, the inner wall portion 132, the outer wall portion 134, the first layer 110 and the second layer 108 may be comprised of an integral, unitary, single piece of material. The inner wall portion 132, the outer wall portion 134, the first layer 110, and the second layer 108 may be integrally formed with the tabletop 12 as part of a unitary, one-piece structure. For instance, in a blow-molded process, the material that is used to form the tabletop 12 may be one cylinder of molten or semi-molten plastic that is blown into a mold to create the tabletop 12 as a unitary structure. The end 144 may be formed by a contact, joining, mating, and/or connection of the inner wall portion 132 and the outer wall portion 134, which may be referred to as a compression edge. The end 144 may be formed by the connection of the inner wall portion 132 and the outer wall portion 134 as well as some additional material that is adjacent to the connection. This adjacent material and the connection may make up the terminal portions 146 and 148.

With reference to FIGS. 6 and 7, the protruded feature 126 implementing the angular geometry may include one or more angled portions. For instance, the inner wall portion 132 of the protruded feature 126 may angle towards the corresponding outer wall portion 134. Additionally, the protruded feature 126 may include faces 150 (see, e.g., FIG. 7) that is angled towards one another. With reference to FIGS. 6 and 9, the protruded feature 126 implementing the curved geometry may include a curved face. For instance, the inner wall portion 132 of the protruded feature 126 may curve along the outer wall portion 134.

Figure 11:
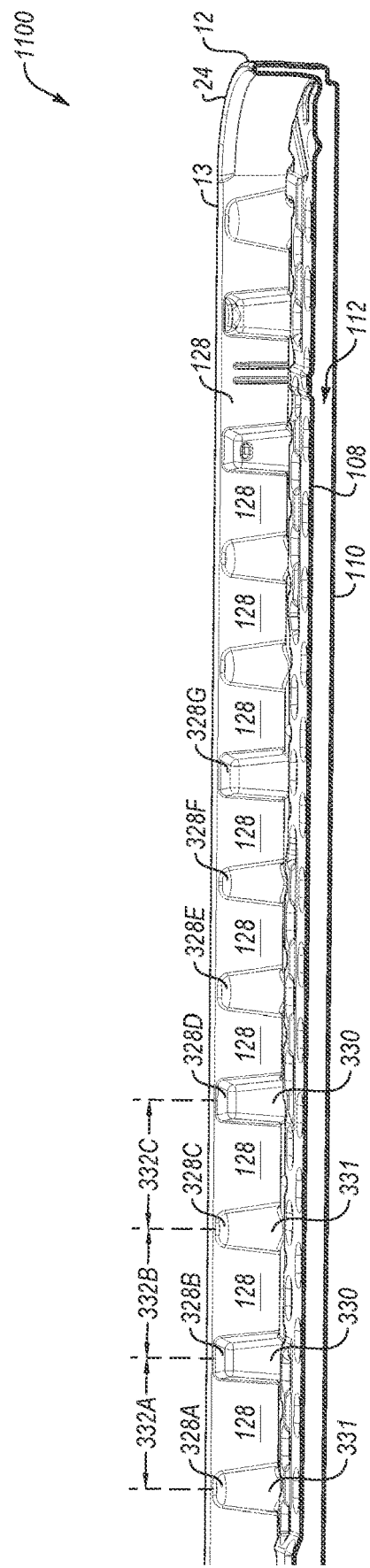
FIG. 11 is an enlarged view of a portion of an exemplary tabletop of the table of FIG. 1.

The size and shape of the protruded features 126 shown in FIGS. 1-9 are not intended to be limiting. For instance, FIG. 11 depicts alternative protruded features 328 that have a different size, shape, configuration, and arrangement than the protruded features 126. For example, the protruded features 328 may include a more or less rectangular shape than the protruded features 126 of FIGS. 6 and 7. Some additional details of the protruded features 328 are provided below.

Figure 8:
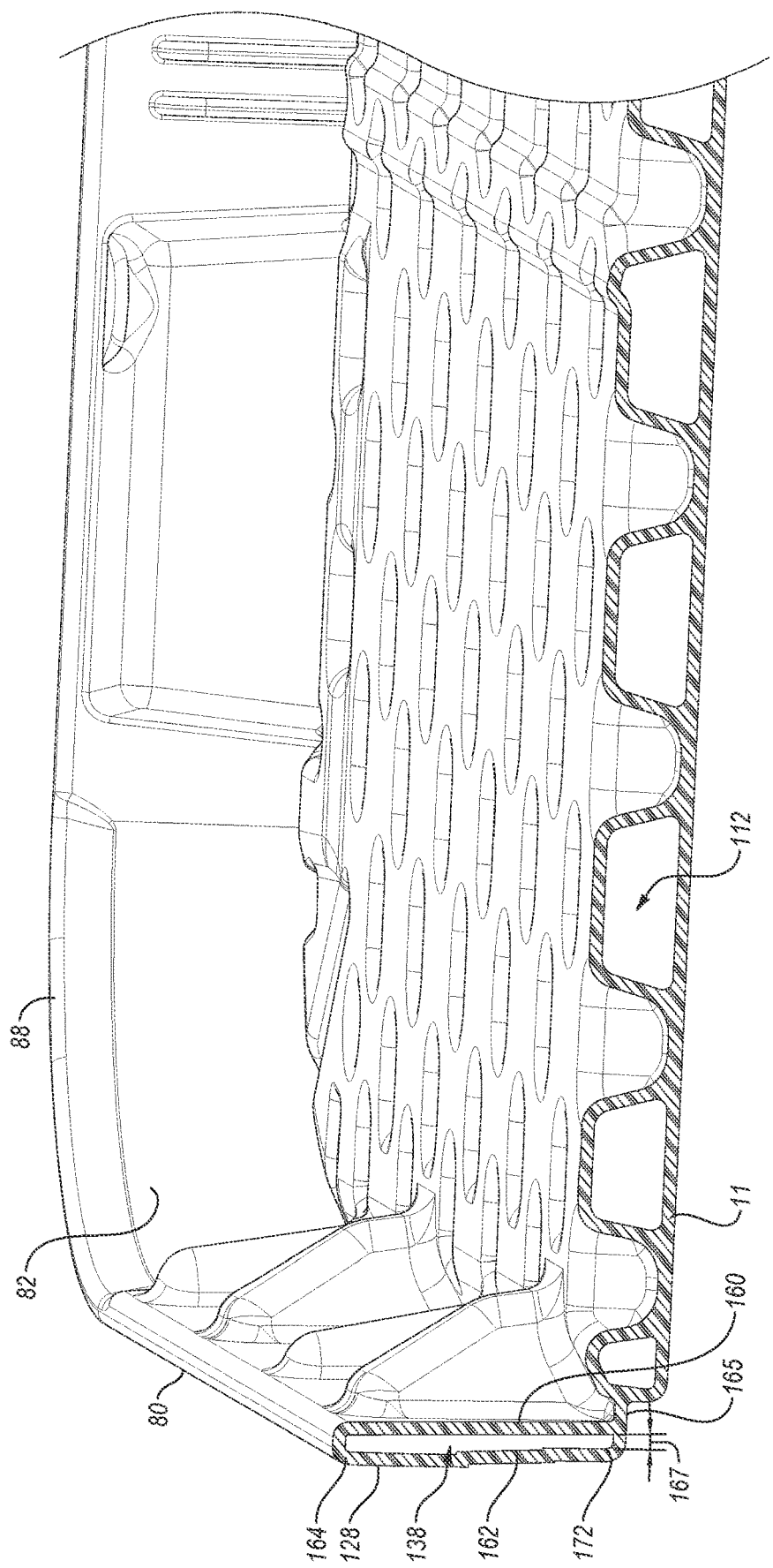
FIG. 8 depicts a sectional view of one of the structural features that may be implemented in the tabletop of the table of FIG. 1.

FIGS. 6 and 8 depict sectional views of the structural features 128 according to at least one exemplary embodiment. As described above, FIG. 6 is a sectional view of the lip structure 13 with the sectioning plane that is substantially parallel to the first plane of the generally planar element 11. FIG. 8 depicts another sectional view of one of the structural features 128.

With combined reference to FIGS. 6 and 8, the structural features 128 may include an inner wall portion 160 of the inner wall 82 and a corresponding outer wall portion 162 of the outer wall 80. The inner wall portion 160 may be oriented substantially normal to the generally planar element 11 and substantially parallel to the corresponding outer wall portion 162. For example, the corresponding outer wall portion 162 may extend in a substantially normal direction (e.g., the y-direction shown in FIG. 8) from the generally planar element 11. Similarly, the inner wall portion 160 may also extend in the substantially normal direction, and parallel to the corresponding outer wall portion 162. The corresponding outer wall portion 162 or a part thereof may be separated from a part of the inner wall portion 160 by an inner wall distance 167. The inner wall distance 167 may be less than about 1.5 millimeters (mm), less than about 1.0 mm, less than about 0.5 mm, or another suitable distance.

With reference to FIG. 8, the structural feature 128 may include a lower connecting portion or a bottom surface, such an end 164. The structural feature 128 may also include an upper connecting portion such as a joint 165. The end 164 may be similar to the end 144. For example, the end 164 may be formed of the terminal portions 148 and 146 of the walls 80 and 82. An outer surface of the end 164 may be aligned with an outer surface of the end 144, and the outer surfaces of the ends 164, 144 may form at least a portion of the bottom edge 88. The second cavity 138 may be at least partially formed or bound by the end 164 and the joint 165.

The end 164 may include the terminal portions 146 and/or 148 that may include about forty-five percent (45%) of the corresponding outer wall portion 162 and/or the inner wall portion 160, about thirty-five percent (35%) of the corresponding outer wall portion 162 and/or the inner wall portion 160, about twenty-five percent (25%) of the corresponding outer wall portion 162 and/or the inner wall portion 160, about fifteen percent (15%) of the corresponding outer wall portion 162 and/or the inner wall portion 160, about five (5) percent (5%) of the corresponding outer wall portion 162 and/or the inner wall portion 160, or less. The terminal portions 146 and/or 148 of the end 164 may be different from the terminal portions 146 and/or 148 of the end 144.

The joint 165 may separate the second cavity 138 from the volume 112. In particular, the joint 165 may prevent fluid communication between the volume 112 and the second cavity 138. The joint 165 may extend along and may form a portion of the structural feature 128. The joint 165 may be disposed between two of the protruded features 126. The joint 165 may bound or define a portion of the second cavity 138. Accordingly, the inner wall distance 167 between the inner wall portion 160 and the outer wall portion 162, the end 164, and the joint 165 may define at least a portion of a perimeter or outer boundary of the second cavity 138.

The joint 165 may be part of a receiving portion 170 and may be used to attach or connect the structural feature 128 to the perimeter 15 of the generally planar element 11. The receiving portion 170 may be configured to receive a portion of another tabletop 12 in a nested configuration. The receiving portion 170 may be similar to the receiving portion described in U.S. Pat. No. 9,138,050, which is incorporated by reference in its entirety.

In embodiments that include the receiving portion 170, the structural features 128 may provide increased structural integrity and/or rigidity. For example, referring to FIGS. 16 and 17, the structural features 128 may provide increased strength substantially in the y-direction while multiple tables 10A-10C are in a stacked configuration 500. For example, the receiving portion 170 may include a generally L-shaped shape. The receiving portion 170 may include a horizontal portion 172 (substantially aligned with the x-axis of FIG. 8) and a vertical portion 174 (substantially aligned with the y-axis of FIG. 8). In the stacked configuration, the bottom edge 88 of a first (upper) tabletop 12 may be placed on a horizontal portion 172 of a subsequent (lower) tabletop 12. Similarly, the bottom edge 88 of the subsequent tabletop 12 may be placed on the horizontal portion 172 of a next subsequent tabletop 12, etc. Accordingly, a stress associated with the stacked tabletops may be applied to the horizontal portions 172 of the tabletops. Indeed, a tabletop 12 at a bottom or near the bottom of several stacked tabletops may be under the force of a sum of the weight of the tables stacked thereon. Accordingly, the structural features 128 may provide additional support, which may enable larger stacks of tables or reduce the likelihood that the tabletops are damaged in the stacked configuration.

In some embodiments, the tabletop 12 implementing the lip structure 13 may not include the receiving portion 170. For example, the joint 165 may be positioned or aligned in the plane of the outer surface 116, the upper portion 14, or the lower portion 16 of the tabletop 12. Additionally or alternatively, the outer wall 80 may be aligned with the perimeter 15 of the generally planar element 11.

Figure 10:
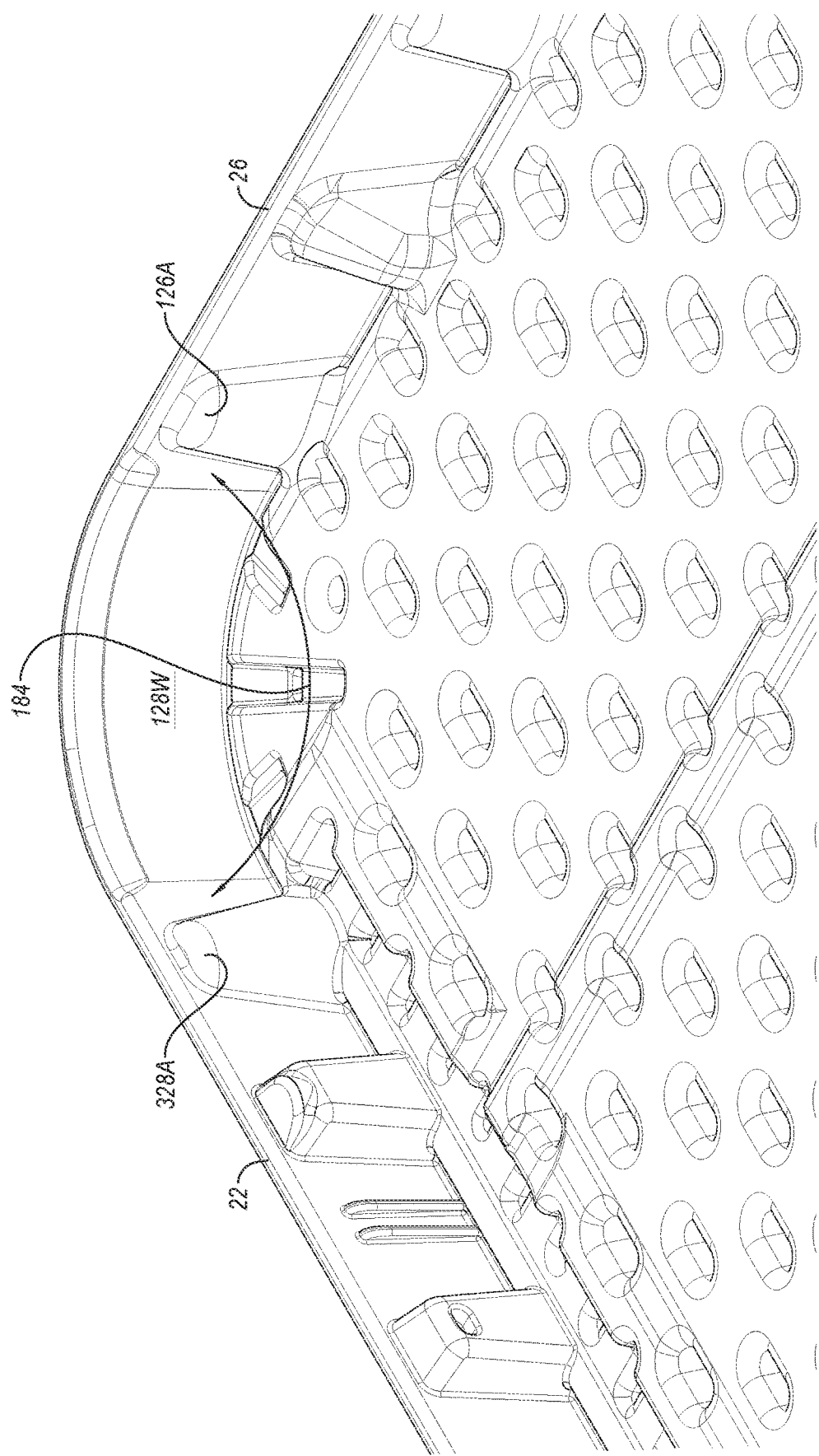
FIG. 10 is an enlarged view of a portion of an exemplary tabletop of the table of FIG. 1.

FIGS. 10 and 7 illustrate an exemplary curved structural feature 128W. The curved structural feature 128W may have a similar size, shape, configuration, and/or arrangement as the structural features 128 described above, and may include a curve. The curved structural feature 128W may be disposed between one of the sides 22 and one of the ends 26, and the curved structural feature 128W may be oriented at an angle 184. For instance, in FIG. 10 a first portion of the lip structure 13 may be disposed along the end 26. A second portion of the lip structure 13 may be disposed along the side 22. The side 22 may be oriented at the angle 184 relative to the end 26.

A first protruded feature 126A may be located on the end 26. A second protruded feature 328A may be located on the side 22. The first protruded feature 126A and the second protruded feature 328A may be substantially similar to the protruded features 126 described above. For instance, the first protruded feature 126A and the second protruded feature 328A may at least partially form or define cavities (e.g., the first cavities 136 and/or the third cavities 135). The curved structural feature 128W may be disposed between the first protruded feature 126A and the second protruded feature 328A. The curved structural feature 128W may be positioned between the end 26 and the side 22. In particular, the curved structural feature 128W may be curved to form the corner 24 between the end 26 and the side 22.

In the embodiment of FIGS. 10 and 7, the angle 184 may be about ninety (90) degrees. In other embodiments, the angle 184 may be greater than ninety (90) degrees or less than ninety (90) degrees. In addition, in some embodiments, the curved structural feature 128W may extend around a curved outer perimeter. For instance, the generally planar element 11 may include a circular table. The curved structural feature 128W may extend around the curved outer perimeter of the circular table.

In the embodiment of FIG. 10, the first protruded feature 126A and the second protruded feature 328A may have different shapes. For example, the first protruded feature 126A may include angled side faces 150 and the second protruded feature 328A may include a substantially rectangular structure.

The curved structural feature 128W may have a size, shape, configuration, and/or arrangement similar to the structural features 128 described with above. For example, the curved structural feature 128W may include the second cavity 138 that is bound by the joint 165, the end 164, the inner wall portion 160, and the outer wall portion 162. In addition, the receiving portion 170 may be disposed along the curved structural feature 128W. In some embodiments, the second cavity 138 may extend from the first protruded feature 126A to the second protruded feature 328A.

FIG. 11 depicts another exemplary portion 1100 of the tabletop 12. The portion 1100 of the tabletop 12 in FIG. 11 depicts one of the sides 22 a portion of the tabletop 12 and a portion of the lip structure 13 that extends about the side 22. In FIG. 11, the generally planar element 11 may extend in the z-direction of the arbitrarily defined coordinate system of FIG. 11. In this portion 1100 of the tabletop 12, the volume 112 is shown between the layers 108 and 110.

The lip structure 13 of the portion 1100 may be substantially similar to the lip structure 13 described above. For instance, the portion 1100 may include the structural features 128 and the protruded features 328 (only a subset of which are labelled in FIG. 11). The protruded features 328 may provide a similar function to the protruded features 126 described above. The protruded features 328 of FIG. 11, however, may have a different size, shape, configuration, and/or arrangement. For instance, one or more of the protruded features 328 (e.g., protruded features 328B and 328D) may include a rectangular geometry. For example, the protruded features 328 having the rectangular geometry may have substantially lateral (e.g., generally in the YX plane) faces 330 instead of angled faces (such as the faces 150 described above). The protruded features 328 with the rectangular geometry may enable a portion of the frame to be positioned substantially flat against the protruded features 328. For instance, the faces 330 of the protruded features 328 may abut against a flat surface of the frame such as the side rails 42 and 44 described elsewhere in the present disclosure.

Additionally, one or more of the protruded features 328 (e.g., protruded features 328A, 328C, 328E and 328F) may implement a rounded geometry. For instance, an outer surface 331 may curve from a first side to a second side of the protruded feature 328. Additionally, the rounded geometry may include a width (e.g., a dimension in the x direction) that is more narrow at the top (having a greater y dimension) than at the bottom (having a lower y dimension). The protruded features 328 that implement the rounded geometry may be substantially similar to the protruded features 126 that implement the rounded geometry.

The protruded features 328 may be separated by one or more distances 332A-332C (generally, distances 332 or distance 332). The distances 332 may be substantially similar or the same. Alternatively, in some embodiments, the distances 332 may differ from one another. The distances 332 may be sized and configured to provide additional structural rigidity and/or support to desired portions of the tabletop 12, such as the center of the tabletop 12.

Figure 12:
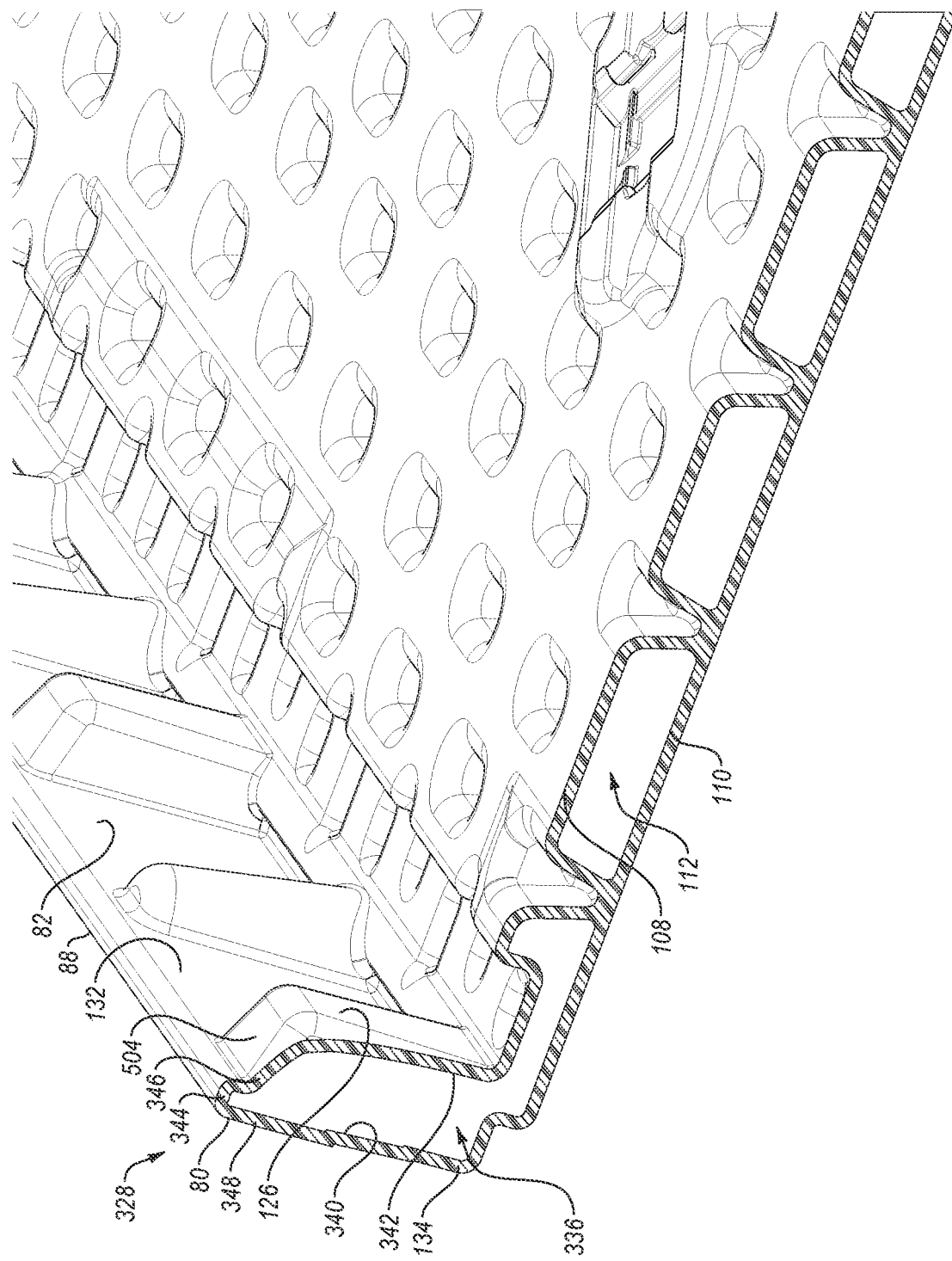
FIG. 12 depicts a sectional view of one of the protruded features that implements a rectangular geometry that may be implemented in the tabletop of the table of FIG. 1.

FIG. 12 depicts a sectional view of the protruded features 328 that implements the rectangular geometry. The protruded feature 328 may be implemented along the side 22 of the tabletop 12 described above. As discussed above, the side 22 of the tabletop 12 may also include the structural feature 128 and one or more of the protruded features 126 that implements the curved geometry. Sectional views of the structural feature 128 and the protruded features 126 may be substantially similar to the sectional views of FIG. 8 and FIG. 9, respectively.

In the embodiment shown in FIG. 12, the protruded feature 328 may include the inner wall portion 132 and the outer wall portion 134. The inner wall portion 132 may be formed from a portion of the inner wall 82 and the outer wall portion 134 may be formed from a portion of the outer wall 80. The inner wall portion 132 may be positioned or spaced apart from the corresponding outer wall portion 134. For example, the inner wall portion 132 may extend inwardly to form an interior space such as a fourth cavity 336.

The fourth cavity 336 may be at least partially formed or defined between an inner surface 340 of the corresponding outer wall portion 134 and an inner surface 342 of the inner wall portion 132. The fourth cavity 336 may extend and/or be in fluid communication with one or more of the volumes 112 in the generally planar element 11. Additionally, the fourth cavity 336 may be in fluid communication other cavities defined in the tabletop 12. For example, the fourth cavity 336 may be in fluid communication with cavities/volumes 138, 136, 112, and 135 (e.g., the cavity 138 of the structural features 128, the cavity 328 of the protruded features 328/126 that implement the rounded geometry, the cavity 136 of the protruded features that implement the angular geometry). Accordingly, as described above, gas may flow through the volumes 112 and into the cavities 336, 135, 136, and 138 of the protruded features 126 and 328 during the molding process. Gas may also flow through the cavities 336, 135, 136, and 138 and into the structural features 128 during the molding process.

The protruded features 328 may include a connecting portion or bottom surface, such as an end 344. The end 344 may be formed by a terminal portion 348 of the outer wall portion 134 and a terminal portion 346 of the inner wall portion 132. The terminal portion 348 of the corresponding outer wall portion 134 may be molded with the terminal portion 346 of the inner wall portion 132 to create a structure at the bottom edge 88. The terminal portions 346 and/or 348 may include about forty-five percent (45%) of the corresponding outer wall portion 134 and/or the inner wall portion 132, about thirty-five percent (35%) of the corresponding outer wall portion 134 and/or the inner wall portion 132, about twenty-five percent (25%) of the corresponding outer wall portion 134 and/or the inner wall portion 132, about fifteen percent (15%) of the corresponding outer wall portion 134 and/or the inner wall portion 132, about five percent (5%) of the corresponding outer wall portion 134 and/or the inner wall portion 132, or less. The end 344 may include a rounded an external surface and the end may be aligned with the bottom edge 88.

In the embodiment shown in FIG. 12, the inner wall portion 132, the outer wall portion 134, the first layer 110 and the second layer 108 may be comprised of an integral, unitary, single piece of material. As described above, the inner wall portion 132, the outer wall portion 134, the first layer 110, and the second layer 108 may be integrally formed with the tabletop 12 as part of a unitary, one-piece structure. For instance, in a blow-molded process, the material that is used to form the tabletop 12 may be one cylinder of molten or semi-molten plastic that is blown into a mold to create the tabletop 12 as a unitary structure. The end 344 may be formed by a connection of the inner wall portion 132 and the outer wall portion 134, which may be referred to as a compression edge. The end 344 may be formed by the connection of the inner wall portion 132 and the outer wall portion 134 as well as some additional material that is adjacent to the connection. This adjacent material and the connection may make up the terminal portions 346 and 348.

The protruded feature 328 implementing the rectangular geometry may include one or more lateral portions. For instance, the inner wall portion 132 of the protruded feature 328 may substantially parallel to and spaced apart from the outer wall portion 134. Additionally, the protruded feature 328 may include an upper surface 504 that is substantially perpendicular to the outer wall portion 134 and the inner wall portion 132.

Figure 13:
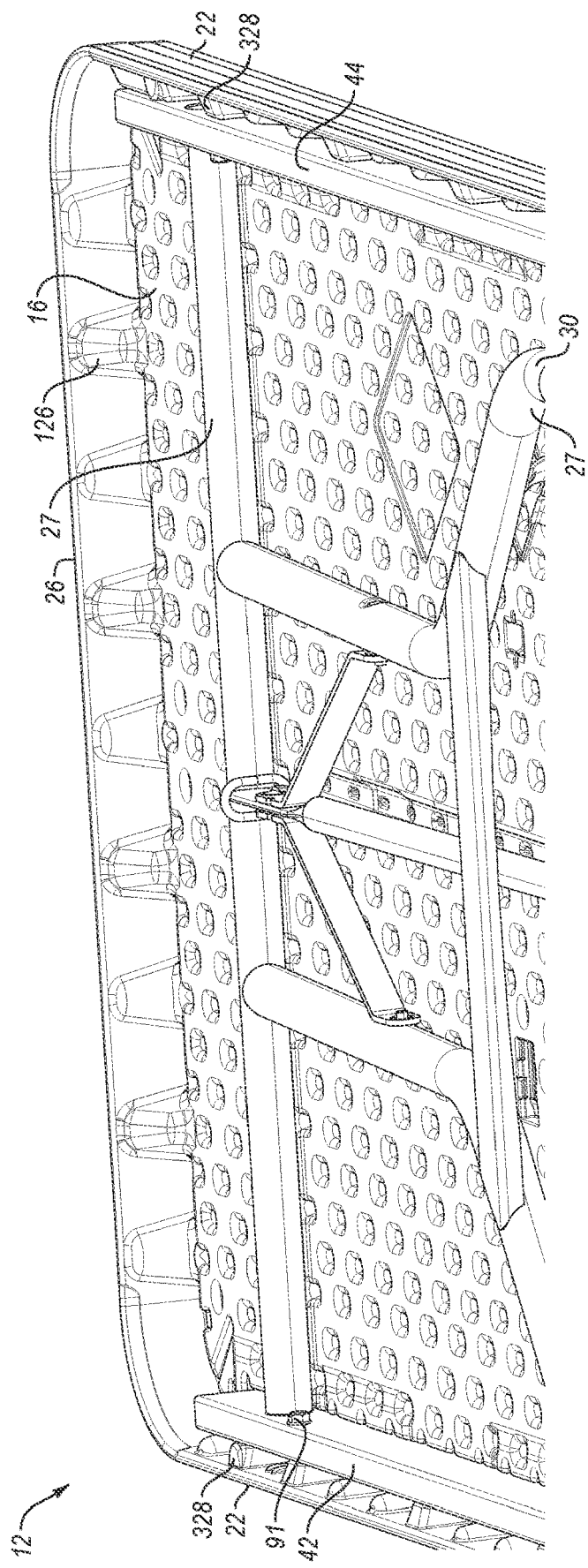
FIG. 13 depicts an exemplary portion of the tabletop that includes an end and two sides, and portions of the frame positioned adjacent to an inner surface of the tabletop.
Figure 14:
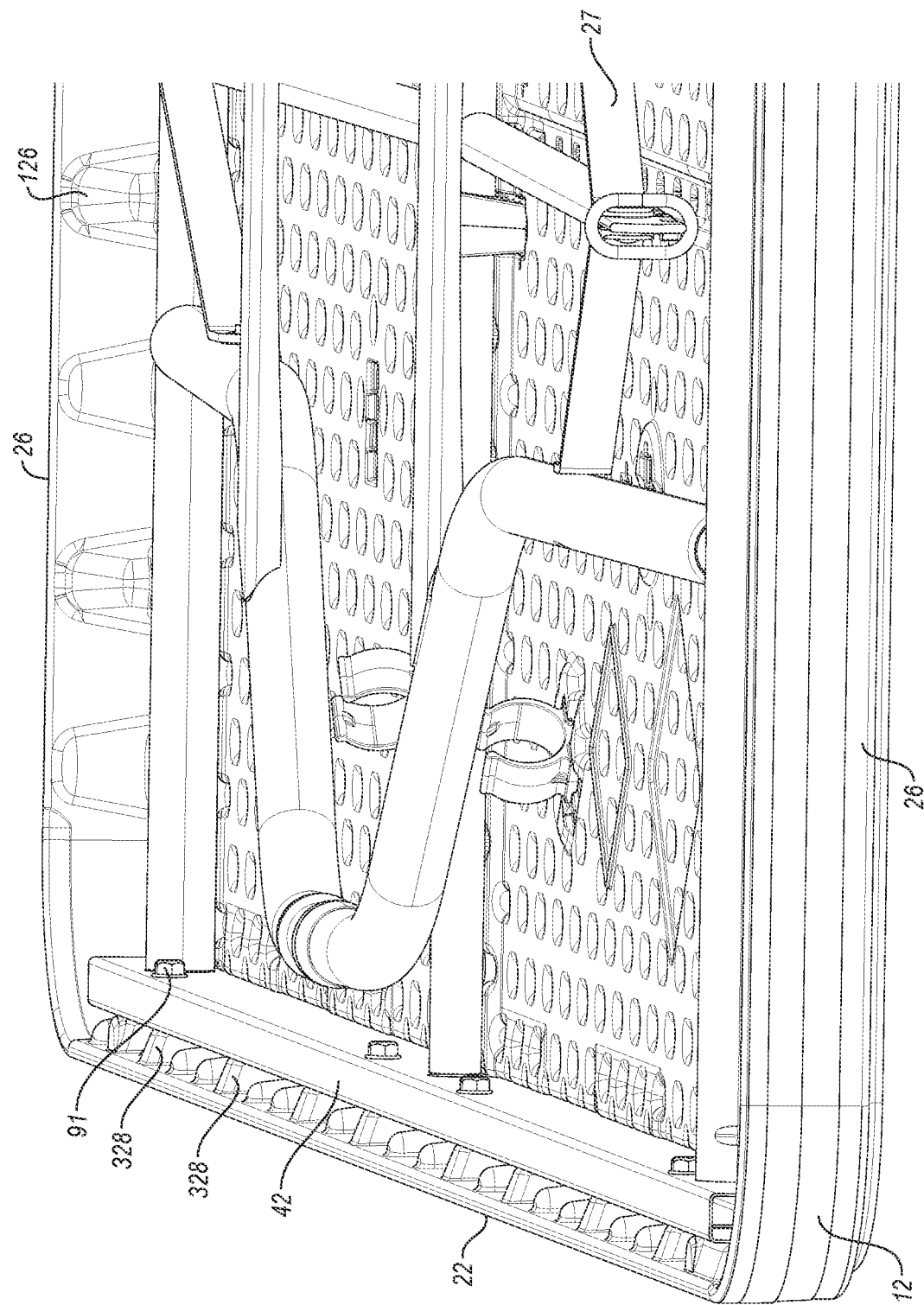
FIG. 14 depicts another exemplary portion of the tabletop that includes an end and two sides, and portions of the frame positioned adjacent to an inner surface of the tabletop.
Figure 15:
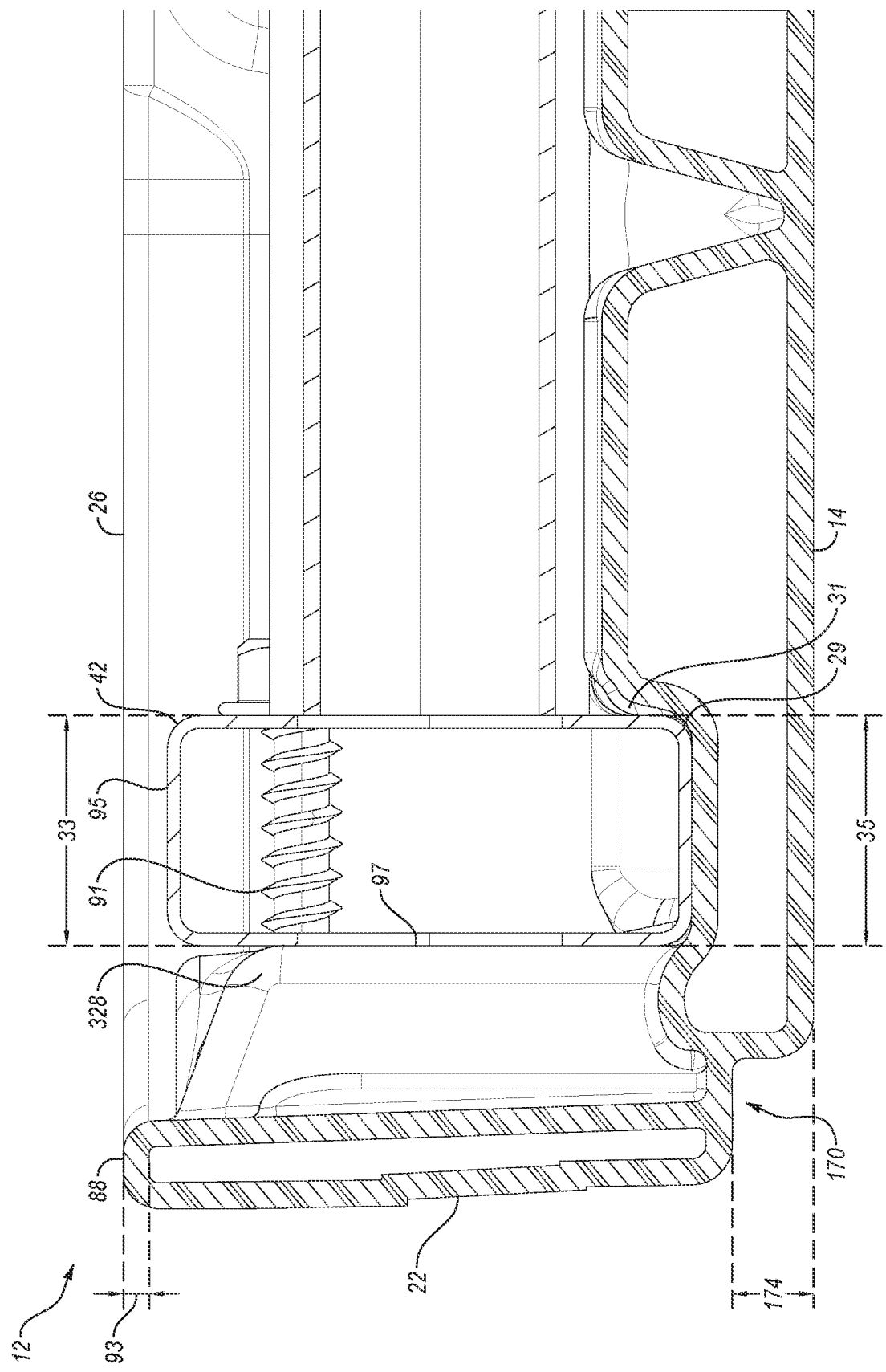
FIG. 15 depicts a sectional view of a portion of the frame disposed in a recess that may be defined in the tabletop of the table of FIG. 1.

FIGS. 13-15 depict portions of the tabletop 12 interfaced with portions of the frame 36. For instance, FIGS. 13 and 14 depict the end 26 and the two sides 22 connected to the end 26. In FIGS. 13 and 14, portions of the frame 36 are positioned adjacent to the lower portion 14 of the generally planar element 11. FIG. 15 depicts a sectional view of a portion (e.g., the side rail 42) of the frame 36 disposed in one of the recesses 28 defined in the generally planar element 11.

In the depicted embodiment, the side rail 42 is substantially rectangular. Accordingly, an outer element of the side rail 42 may be positioned adjacent to an outer surface of the protruded features 328, such as the outer surface of the protruded features that implement the rectangular geometry. The side rail 42 may be mechanically coupled to the tabletop 12 at the one or more of the protruded features 328. For instance, in some embodiments fasteners 91 may be penetrate the side rail 42 and be received in the protruded features 328. The fasteners 91 may couple the frame 36 relative to the tabletop 12. Because the protruded features 328 that implement the rectangular geometry include a substantially flat surface, such as the surface 97, and the side rail 42 may include a substantially flat surface, the side rail 42 may be securely connected to the tabletop 12 in a substantially stable manner.

In the depicted embodiment, four fasteners 91 are used to mechanically couple the side rail 42 relative to the tabletop 12. One of the four fasteners 91 are positioned near each end 26 and two fasteners 91 may be positioned near a center recess 32. In other embodiments, more than four fasteners 91 or fewer than four fasteners 91 may be implemented to mechanically couple the side rail 42 to the tabletop 12. For instance, an embodiment may include five, six, seven, or eight fasteners 91 may be implemented.

Additionally, the recess 28 may include an angled feature 29. The angled feature 29 may include a portion that is defined to receive the rectangular cross section of the side rail 42. For example, a portion 31 of the angled feature 29 may extend up or along an inner portion of the side rail 42. A distance 33 between the portion 31 of the angled feature 29 and the surface of the protruded features 328 may correspond to a width 35 of the side rail 42. Accordingly, the recess 38 may be configured to receive the side rail 42, which may help prevent rotation of the side rail 42 and may help secure the side rail 42 relative to the tabletop 12.

Referring to FIG. 15, the recess 38 may be configured to position the side rails 42 relative to the bottom edge 88. For instance, a distance 93 may be defined between a bottom surface 95 of the side rails 42 and the bottom edge 88. The distance 93 may be related to the vertical portion 174 of the receiving portion 170. In some embodiments, the distance 93 may be sized such that in a stacked configuration (e.g., the stacked configuration 500 of FIGS. 16 and 17), the bottom surface 95 of the side rail 42 may rests against or contact an upper portion 14 of the tabletop 12. Alternatively, the distance 93 may be sized such that in the stacked configuration, the bottom edge 88 rests against a horizontal surface of the receiving portion 170.

Figure 17:
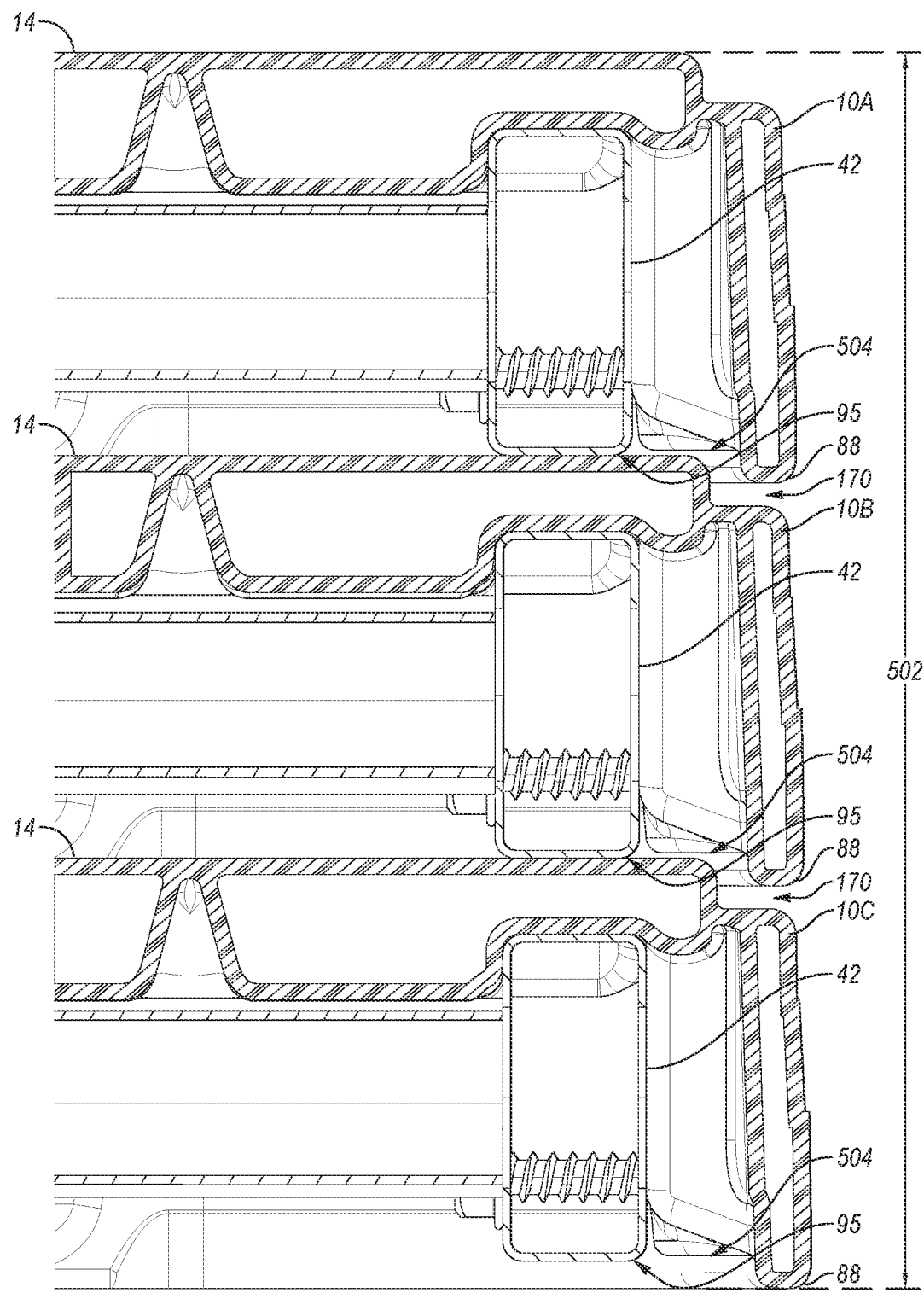
FIG. 17 is a detailed sectional view of an exemplary portion of the tables in the stacked configuration.

FIGS. 16 and 17 depict multiple embodiments of the table 10 shown in FIGS. 1-4 in a stacked configuration 500. In FIGS. 16 and 17, the stacked configuration 500 includes an uppermost table 10A, a middle table 10B, and a lowermost table 10C. The uppermost table 10A, the middle table 10B, and the lowermost table 10C are collectively referred to as the tables 10. FIG. 16 depicts an external view of the tables 10. FIG. 17 depicts a partial sectional view of a portion of the tables 10.

In FIGS. 16 and 17, three of the tables 10 are included in the stacked configuration 500. In other embodiments, two or more tables 10 may be included in the stacked configuration 500. For instance, the tables 10 may be sold in sets of eight or twelve. The tables 10 may be shipped and/or stored in a stacked configuration 500 that includes eight or twelve of the tables 10. In the stacked configuration 500, the stacked tables 10 may be nested together to reduce a height 502 of the tables 10. Reduction in the height 502 may allow the tables 10 to be shipped, stored, and transported in a smaller volume.

With reference to FIG. 17, in the stacked configuration 500, the lower surface of the side rail 42 of the uppermost table 10A may be positioned on the upper portion 14 of a middle table 10. Similarly, the lower surface 95 of the side rail 42 of the middle table may be positioned on the upper portion 14 of the lowermost table 10C. Accordingly, a mass or a weight of the uppermost table 10A may be loaded on the side rail 42 of the middle table 10B. Similarly, a mass or a weight of the uppermost table 10A and the middle table 10B may be loaded on the side rail 42 of the lowermost table 10C.

Additionally, in the stacked configuration 500, the receiving portion 170 or some portion thereof of the lowermost table 10C may be received in a volume defined by the lip structure 13 of the middle table 10B. Similarly, in the stacked configuration 500, the receiving portion 170 or some portion thereof of the middle table 10B may be received in a volume defined by the lip structure 13 of the uppermost table 10A. Such arrangement of the receiving portions 170 within the volumes defined by the lip structure 13 may reduce the height 502 of the stacked configuration 500 relative to tables that are simply stacked one on top of another. Additionally, such arrangement of the receiving portions 170 within the volumes defined by the lip structure 13 may assist in alignment of the tables 10 in the stacked configuration 500.

In other embodiments, other portions or features of the tables 10 may contact one another in the stacked configuration 500. For instance, the bottom edge 88 of the uppermost table 10A may contact a horizontal surface of the receiving portion 170 of the middle table 10B. Similarly, the bottom edge 88 of the middle table 10B may contact a horizontal surface of the receiving portion 170 of the lowermost table 10C. Additionally or alternatively, in some embodiments, the upper surface 504 of the protruded feature 328 may contact the upper portion 14 of the adjacent table 10. For instance, the upper surface 504 of the uppermost table 10A may contact upper portion 14 of the middle table 10B. Similarly, the upper surface 504 of the middle table 10B may contact upper portion 14 of the lowermost table 10C.

FIGS. 18-24 illustrate another exemplary embodiment and identical or comparable reference numbers to those used above may be used for clarity and readability because the tabletop 12 may include one or more similar or related features or aspects to those described above. It will be appreciated, however, that the features and aspects of the tabletop 12 may be different from those described above. For example, one or more of the features and aspects may have different shapes, sizes, configurations, and/or arrangements than those described above. In addition, tabletop 12 may have other features and aspects than those described above.

The tabletop 12 shown in FIGS. 18-24 may include a generally planar element or portion 11, which may form a body or central portion 86 of the tabletop 12. The tabletop 12 may also include a lip structure 15 and the lip structure 15 may include a sidewall, edge, and/or lip. The tabletop 12 may also include sides 22, ends 26, and corners 24. In addition, a plurality of depressions 60 may be disposed in the body 11 of the tabletop 12.

The tabletop 12 may also include a plurality of protruded features 126, which may be referred to as risers. The risers 126 may have a size, shape, configuration, and/or arrangement similar to the protruded features described above. For example, the risers 126 may have rounded geometry or an angled geometry similar to the protruded features. In addition, the risers 126 may have a hollow interior portion, such as the first cavity 136 or the third cavity 138.

Figure 18:
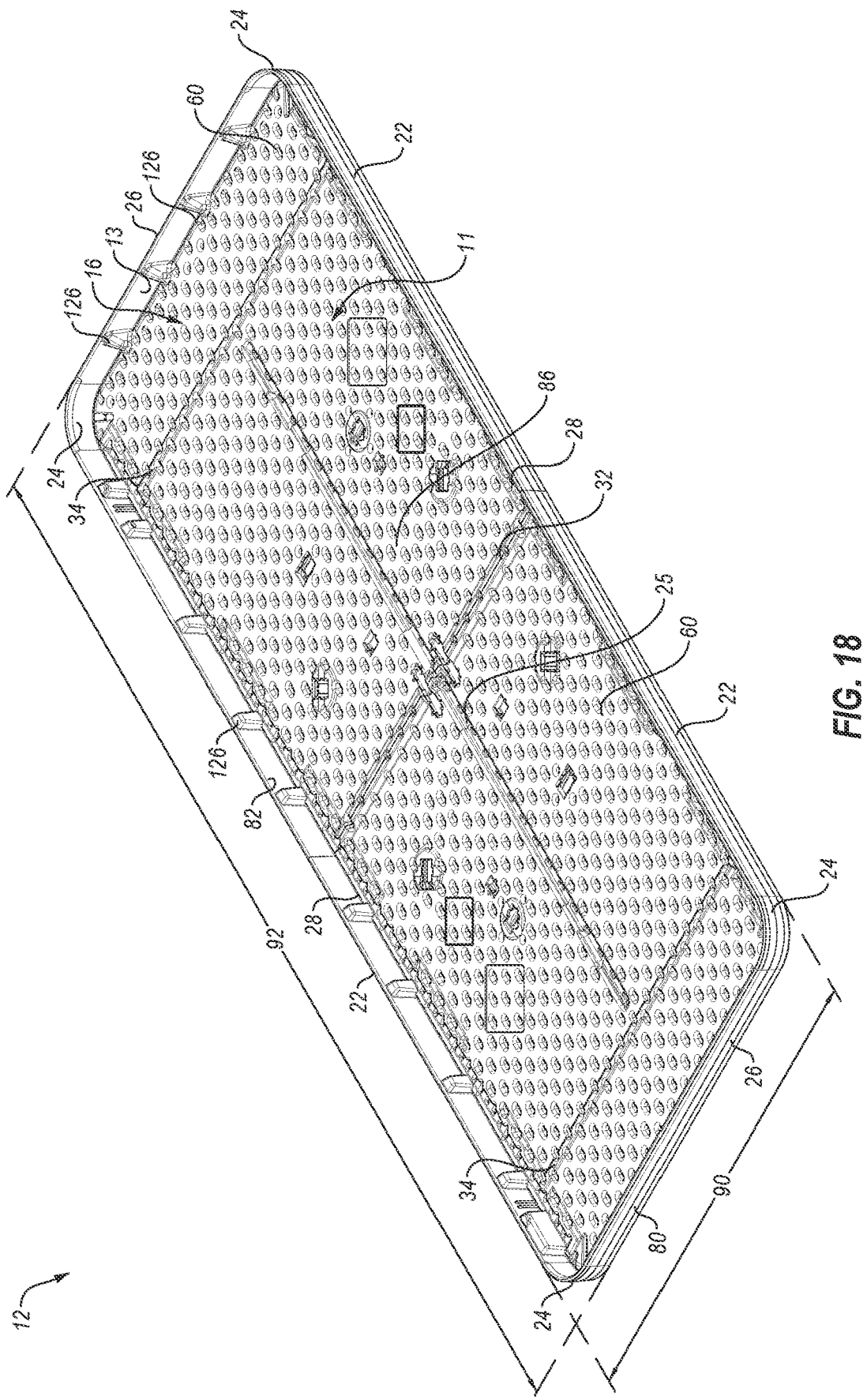
FIG. 18 is a lower perspective view of another exemplary embodiment of a tabletop.
Figure 19:
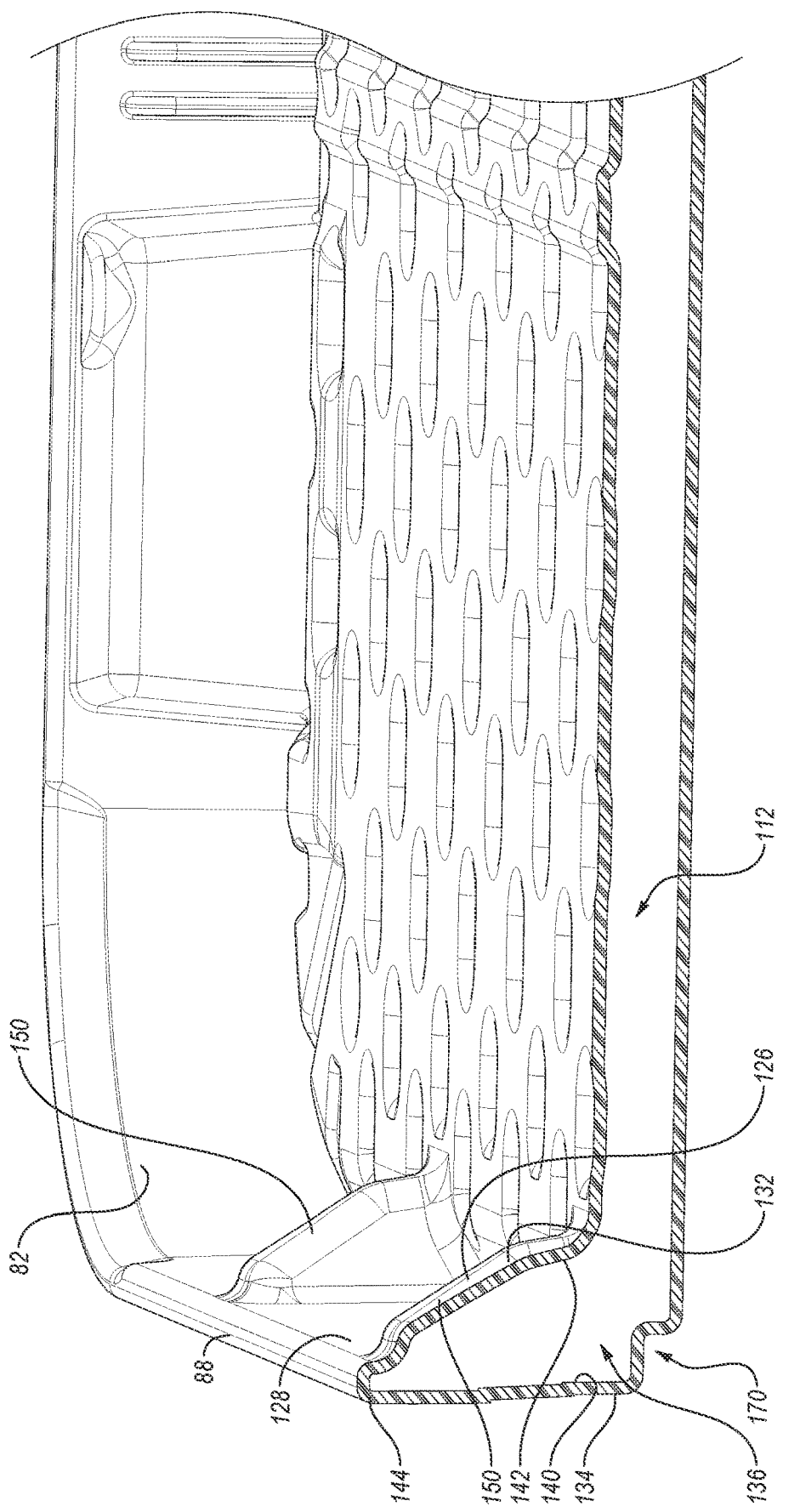
FIG. 19 is a cross-sectional side view of a portion of an exemplary embodiment of a tabletop.

In greater detail, as shown in FIG. 18, the tabletop 12 may also include one or more risers 126 disposed along the sides 22 and the ends 26. One skilled in the art will appreciate, after reviewing this discloser, that the tabletop 12 may include any suitable number of risers 126 depending, for example, upon the size, shape, configuration, and/or arrangement of the tabletop 12. One skilled in the art will also appreciate that the risers 126 may have different sizes, shapes, configurations, and/or arrangements depending, for example, upon the size, shape, configuration, and/or arrangement of the tabletop 12.

As shown in the accompanying figures, the risers 126 may be disposed at least proximate the intersection, connection, or meeting of the body of the tabletop 12 and at least a portion of the lip structure 13, such as the lip. In particular, the risers 126 may be connected to the tabletop 12 and the lip 13. In greater detail, the risers 126 may be connected to the lower portion 16 of the tabletop 12 and the inner surface 82 of the lip 13. For example, the risers 126 may include a first portion connected to the lower portion 16 of the tabletop 12 and a second portion connected to the inner surface 82 of the lip 13.

Figure 20:
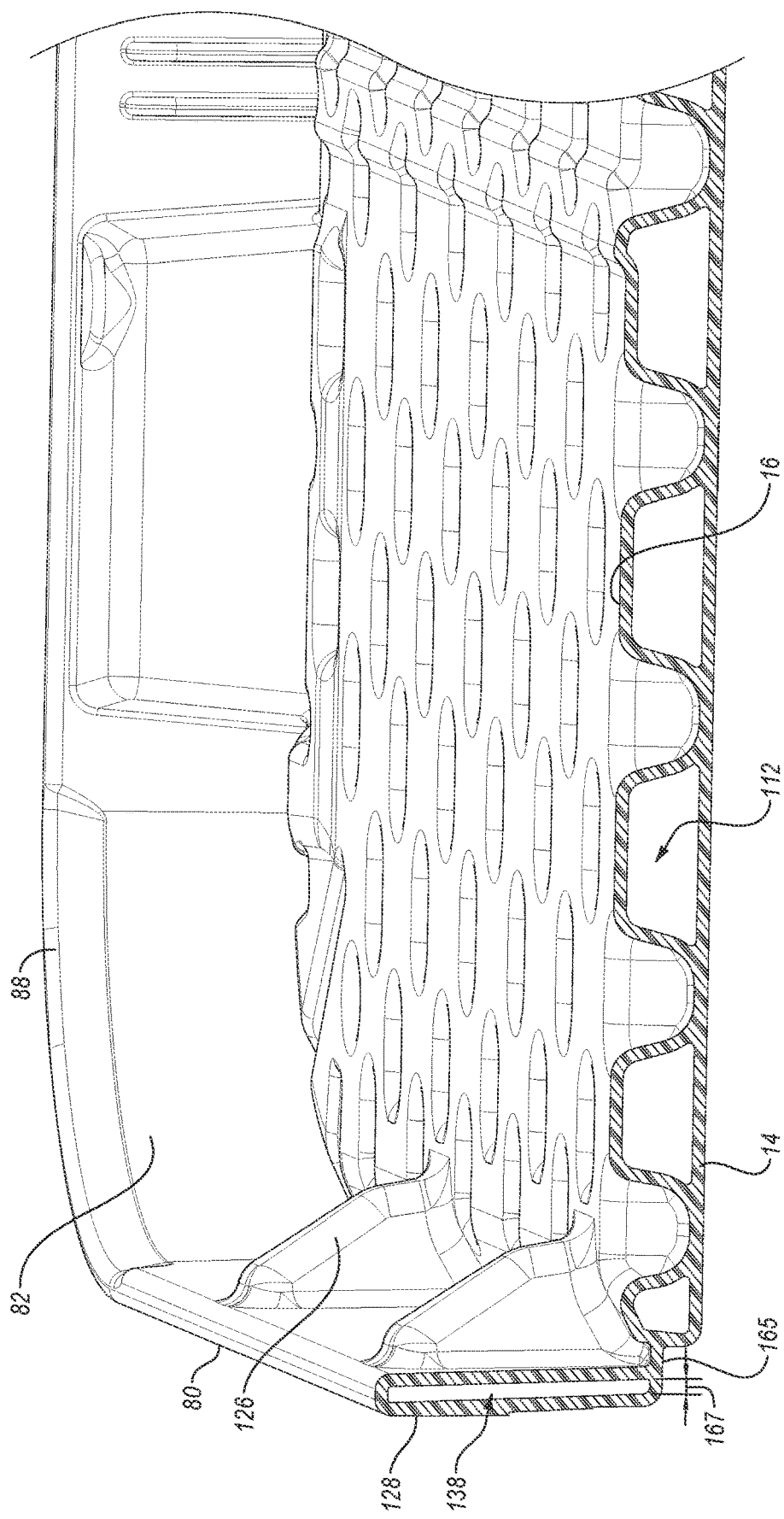
FIG. 20 is a cross-sectional side view of a portion of another exemplary embodiment of a tabletop.
Figure 21:
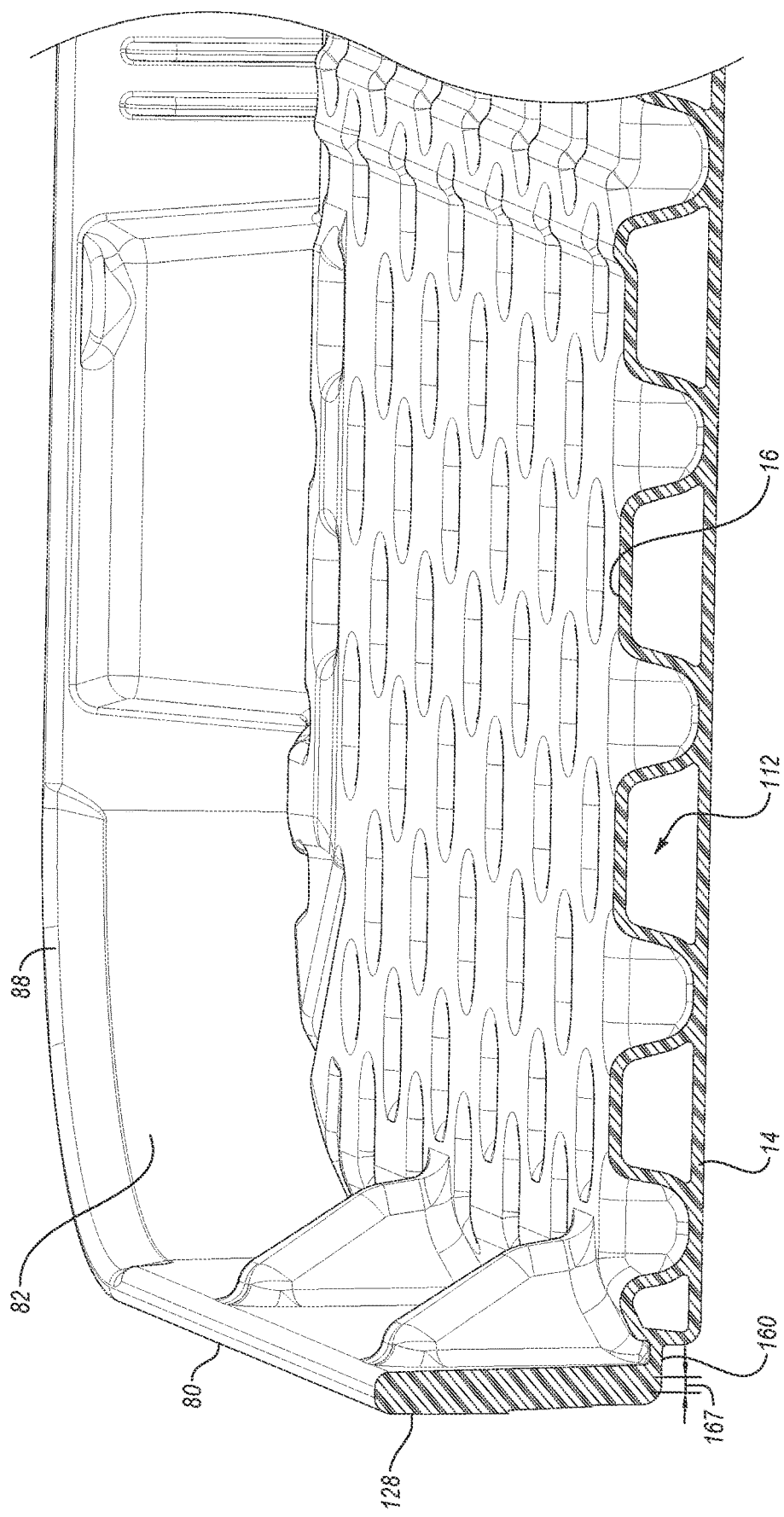
FIG. 21 is a cross-sectional side view of a portion of yet another exemplary embodiment of a tabletop.
Figure 22:
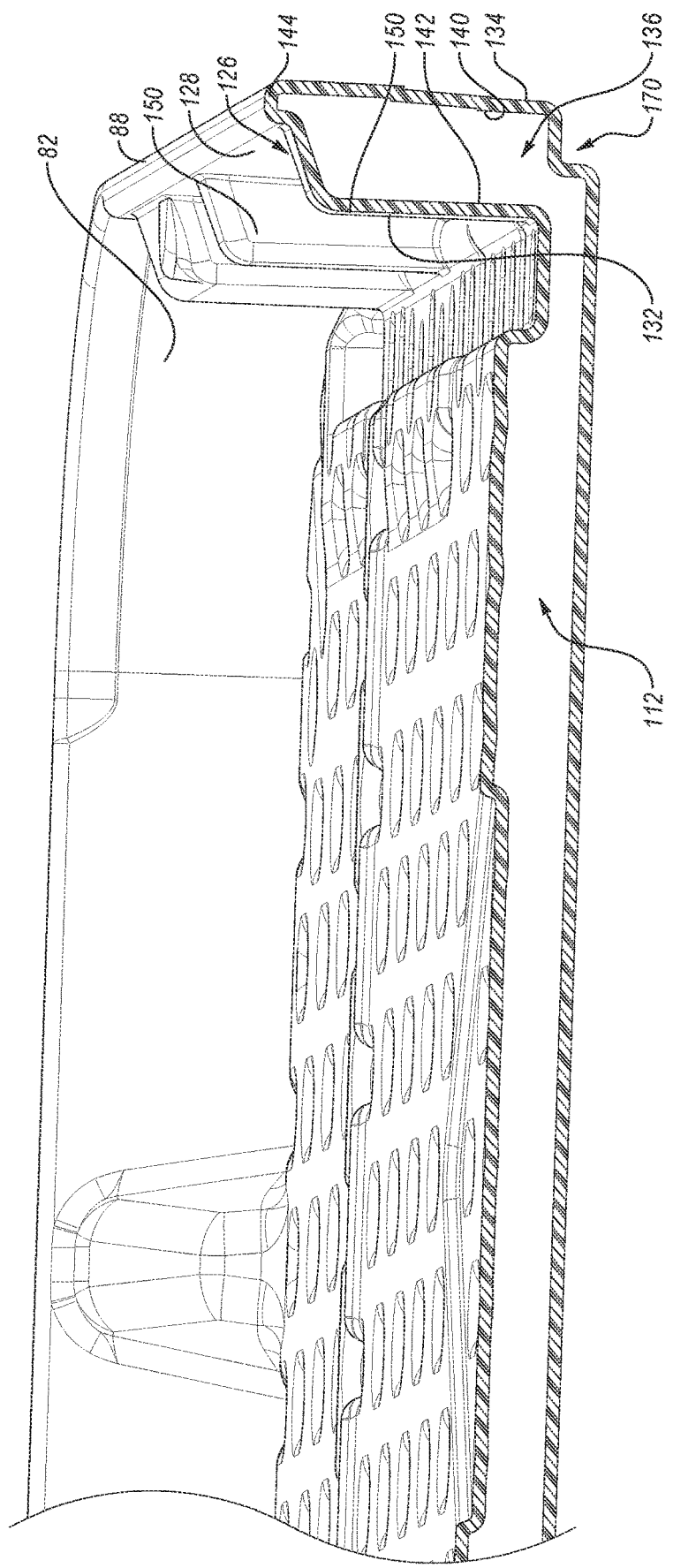
FIG. 22 is a cross-sectional side view of a portion of still another exemplary embodiment of a tabletop.
Figure 23:
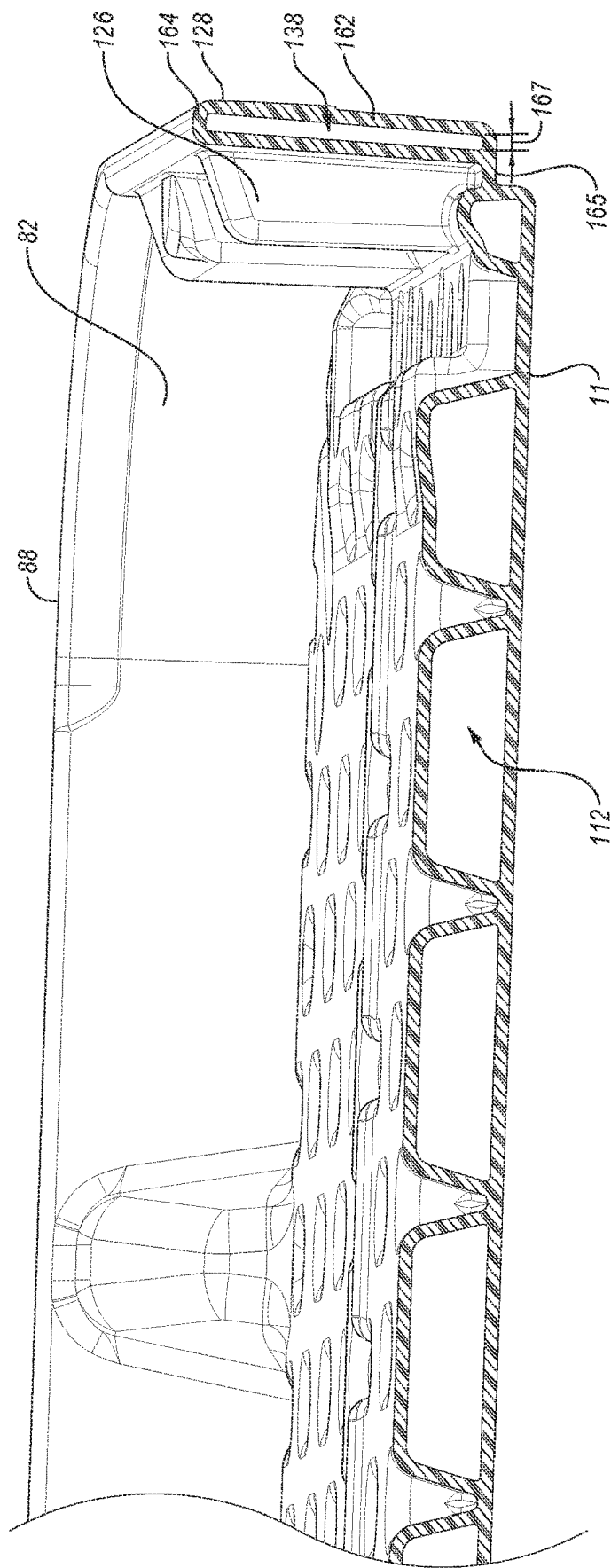
FIG. 23 is a cross-sectional side view of a portion of still yet another exemplary embodiment of a tabletop.
Figure 24:
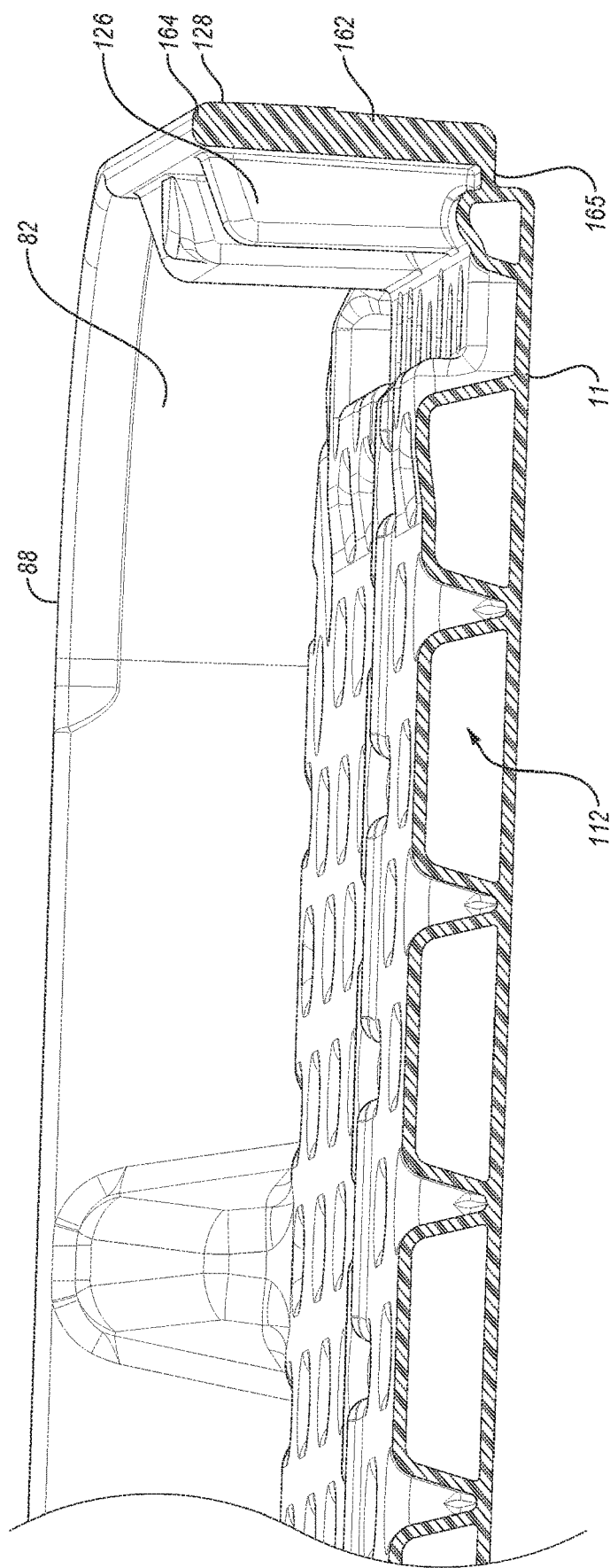
FIG. 24 is a cross-sectional side view of a portion of a further exemplary embodiment of a tabletop.

The riser 126 may include a hollow interior portion 135, such as the cavity 135 or 136 (which also may be referred to as a chamber or opening, and may be used to create a pathway), and the hollow interior portion 135 or 136 may be in fluid communication with at least a portion of the hollow interior portion 112 of the tabletop 12. The hollow interior portion 135 or 136 of the riser 126 may also be in fluid communication with at least a portion of the lip 13, such as the structural feature 128. Similar to that described above, the structural feature 128 may be a portion of the lip 13 disposed between the risers 126. The structural feature 128 may include generally parallel inner and outer surfaces, and the inner and/or outer surfaces of the structural feature 128 may include one or more generally planar surfaces. As described in more detail elsewhere, the inner and outer surfaces of the structural feature 128 may be disposed in close proximity and/or may touch, contact, or engage. For example, as shown in FIGS. 20 and 23, the structural feature 128 may include a hollow interior portion such as the cavity 138. The structural feature 128, however, may be an at least partially solid structure such as shown in FIGS. 21 and 24.

The hollow interior portion 135 or 136 of the riser 126 may be in fluid communication with the hollow interior portion 112 of the tabletop 12 and the hollow interior portion of the lip 13, such as the cavity 138. This may allow the riser 126 to facilitate fluid, such as a gas, flow during a molding process, such as a blow-molding process. In particular, the riser 126 may allow gas, such as air, to flow in the tabletop 12 and the lip 13 during the blow-molding process.

The risers 126 may facilitate gas flow during the blow-molding process so that gas flows into an interior portion 138 of the lip 13, which may help form the lip 13 during the blow-molding process. In particular, the lip 13 may include the hollow interior portion 138 that is in fluid communication with the hollow interior portion 135 or 136 of the riser 126. The risers 126 and the interior portion 138 may facilitate formation of the lip 13 during the blow-molding process and may allow the lip 13 to be formed with the hollow interior portion 138 shown in FIGS. 20 and 23, and/or the solid structure as shown in FIGS. 21 and 24.

In greater detail, in an exemplary embodiment, all or a portion of the structural features 128 of the lip 13 may include a compression edge. In another exemplary embodiment, all or at least a portion of the structural features 128 of the lip 13 may include the hollow interior portion 138 disposed between opposing surfaces. Alternatively, a portion of the structural features 128 may include a compression edge in which opposing surfaces touch or contact and another portion of the structural features 128 may include the hollow interior portion 138. After reviewing this disclosure, one skilled in the art will understand that the structural features 128 of the lip 13 may include a compression edge, a hollow interior portion 138, or a combination of a compression edge and hollow interior portion 138. For example, a first portion, such as a distal portion, of the structural features 128 of the lip 13 may be a compression edge and a second portion, such as a proximal portion, of the structural features 128 of the lip 13 may include the hollow interior portion 138. Thus, for example, an outermost portion of the structural features 128 of the lip 13 may be a compression edge and the portion of the structural features 128 proximate to the body of the tabletop 12 may include the hollow interior portion 138.

The riser 126 may include a height which may be measured relative to the inner surface 82 of the lip 13. The riser 126 may have a height that allows sufficient gas flow during the blow-molding process to allow the lip 13 to be properly formed. The riser 126 may also include one or more sides or outer surfaces. For example, the riser 126 may have two sides or three sides. Additionally, the riser 126 may have one or more rounded surfaces. For instance, the riser 126 may have a generally rounded, conical, or cylindrical configuration. The riser 126 may be tapered or may narrow along its length, if desired. Advantageously, the riser 126 may have a size, shape, configuration, and/or arrangement that facilities gas flow during the blow-molding process. In particular, the riser 126 may allow sufficient gas flow during the blow-molding process to allow the lip 13 to be properly formed.

Because the lip 13 may form an outer boundary or perimeter of the tabletop 12, the lip 13 may be difficult to form during the blow-molding process because the gas may have to flow to the outermost portions of the structure. In addition, the gas must have sufficient pressure to form the lip 13. Thus, the lip 13 may be difficult to form during the blow-molding process because the gas may have to travel significant distances and/or reach remote portions of the structure, and the gas has to be at the correct pressure to properly form the lip 13. If the gas flow and/or pressure are incorrect, then the lip 13 may not be properly formed during the blow-molding process and that may result in failure. Advantageously, the risers 126 may allow sufficient gas flow at the desired pressure to allow the lip 13 to be fully and completely formed during the blow-molding process.

The risers 126 may have a size, shape, configuration, and/or arrangement that facilitates gas flow during the blow-molding process. In particular, the risers 126 may facilitate gas flow during the blow-molding process to allow the lip 13 to be formed with the desired size, shape, configuration, arrangement, properties, and/or characteristics.

The risers 126 may help support to the lip 13. For example, the risers 126 may help prevent movement, such as flexing or bending, of the lip 13. The risers may also help prevent movement of the lip 13 relative to the body of the tabletop 12. In addition, the risers 126 may help prevent rotation of the lip 13 relative to the body of the tabletop. Accordingly, in some exemplary embodiments, the risers 126 may increase the stiffness, rigidity, and/or structural integrity of the lip 13. Advantageously, the risers 126 may strengthen the tabletop 12 and/or may help prevent damage to the tabletop 12.

As shown in FIG. 18, for example, the tabletop 12 may include a plurality of risers 126 and the risers 126 may be spaced in one or more desired locations. One or more of the risers 126 may be spaced generally equidistant along the sides 22 of the tabletop 12. In addition, the risers 126 may be spaced generally equidistant along the ends 26 of the tabletop 12. Advantageously, if the risers 126 are spaced a generally equidistance apart, that may facilitate generally uniform gas flow during the blow-molding process. That is, the generally even spacing of the risers 126 may allow generally even gas flow during the blow-molding process. In an exemplary embodiment, the risers 126 may be spaced apart by a generally equal distance such as about four inches, about five inches, about six inches, about seven inches, about eight inches, about nine inches, about ten inches, about eleven inches, about twelve inches, or more. One skilled in the art, after reviewing this disclosure, will understand that the risers 126 may be spaced apart by any suitable distance depending, for example, upon the size, shape, configuration, and/or arrangement of the tabletop 12.

As shown in the accompany figures, the risers 126 may be spaced apart by a first distance along the sides 22 of the tabletop 12 and a second distance along the ends 26 of the tabletop 12. If desired, the risers 126 along the sides 22 and the ends 26 of the tabletop 12 may be spaced apart by generally the same distance. That is, in this exemplary embodiment, all or substantially all the risers 126 may be spaced apart by generally the same distance. If adjacent risers 126 in the plurality of risers are separated by generally the same distance along the sides 22 and/or the ends 26 of the tabletop 12, more uniform gas flow may occur during the blow-molding process. In addition, the tabletop 12 may have more uniform properties or characteristics.

As shown in FIGS. 18-24, the risers 126 may not be disposed in the corners 24 of the tabletop 12. For example, if the tabletop 12 includes corners 24, the risers 126 may not be disposed in the corners 24. The risers 126, however, may be spaced an equal distance apart from the corners 24. For instance, a first riser 126 may be disposed a first distance from the corner 24 and a second riser 126 may be disposed a second distance from the corner 24, and these distances may be at least approximately the same. In addition, if desired, the distance separating adjacent risers 126 proximate the corners 24 may be generally the same distance as the distance separating adjacent risers 126 along the sides 22 and/or the ends 26 of the tabletop 12. Thus, in an exemplary embodiment, all or substantially all the risers 126 may be separated by generally the same distance whether the risers 126 are located along the sides 22, the ends 26, or the corners 24 of the tabletop 12. One skilled in the art, after reviewing this disclosure, will appreciate that any suitable number of risers 126 may be used and the risers 126 may be separated by any suitable distances.

As shown in FIG. 18, for example, at least some of the risers 126 disposed along the sides 22 of the tabletop may be separated by a generally equal distance. Some risers 126, however, may be separated by a different distance. For example, adjacent risers 126 may be spaced closer together towards the ends 26 of the tabletop 12, towards the corners 24, where the frame 36 may be attached to the tabletop 12, and/or where the legs 30 or the support structures 27 may be attached to the tabletop 12. For instance, the risers 126 may be disposed closer together where the legs 30 or the support structures 27 are connected to the tabletop 12, which may provide additional attachment points for the frame 36 and/or additional support for the legs 30.

The risers 126 may also be disposed in pairs and one or more of the pairs of risers may have a similar configuration. For example, a first pair of risers may be disposed on one side of the tabletop 12 and a second pair of risers may be disposed on an opposing side of the tabletop 12. The tabletop 12 could also include one or more pairs of adjacent risers disposed along the sides 22 and/or ends 26 of the tabletop 12.

As shown in FIG. 18, the risers 126 may be disposed in a generally symmetrical or regular pattern, which may facilitate more uniform gas flow during the blow-molding process. In addition, if the distance separating adjacent risers 126 along the sides 22, the ends 26, and/or the corners 24 is generally the same, that may facilitate more uniform gas flow during the blow-molding process. One skilled in the art will appreciate, after reviewing this disclosure, that additional risers 126 may be disposed in locations where additional gas flow may be desired during the blow-molding process and fewer risers 126 may be disposed in locations where decreased gas flow may be desired during the blow-molding process.

The tabletop 12 shown in FIGS. 18-24 may include one or more elongated tack-offs 165, which may have generally the same structure as the joints 165 described above. The elongated tack-offs 165 may be disposed at least proximate the body or central portion 86 of the tabletop 12 and the lip 13. In particular, the elongated tack-offs 165 may be disposed at least proximate the intersection of the body portion 86 of the tabletop 12 and the lip 13. The elongated tack-offs 165 may be formed when an outer wall or surface of the blow-molded plastic structure, such as the outer wall 80, touches, contacts, mates, or joins another outer wall or surface of the blow-molded plastic structure, such as the inner wall 82. Thus, the elongated tack-offs 165 may have a double-wall thickness. Additionally, the elongated tack-offs 165 may be at least partially disposed between the central portion 86 of the tabletop 12 and the lip 13. The elongated tack-offs 165 may also at least substantially prevent fluid flow between the central portion 86 of the tabletop 12 and the lip 13.

The elongated tack-offs 165 may be similar to the depressions 60 disposed in the body portion 86 of the tabletop 12 but the elongated tack-offs 165 may have a significantly longer length. For example, the length of the elongated tack-offs 165 may be three, four, five, six, or more times the length of the depressions 60 in the body portion 86 of the tabletop 12. For instance, the elongated tack-offs 165 may have a length of about four inches or more, about five inches or more, about six inches or more, about seven inches or more, about eight inches or more, about nine inches or more, about ten inches or more, about eleven inches or more, about twelve inches or more, or more. The length of the elongated tack-offs 165 may be the distance between opposing ends or the distance in which the opposing surfaces touch, contact, join, or mate.

For example, in the exemplary embodiment shown in FIG. 18, the depressions 60 disposed in the body portion 86 of the tabletop 12 may have a length of approximately one inches or less. The elongated tack-offs 165, in contrast, may have a length of approximately three or more inches. In particular, the elongated tack-offs 165 disposed along the sides 22 of the tabletop 12 may have a length of about three inches or more, about four inches or more, about five inches or more, about six inches or more, about seven inches or more, about eight inches or more, about nine inches or more, about ten inches or more, about eleven inches or more, or about twelve inches, or more. The elongated tack-offs 165 disposed along the ends 26 of the tabletop 12 may have a length of about three inches or more, about four inches or more, about five inches or more, about six inches or more, about seven inches or more, about eight inches or more, about nine inches or more, about ten inches or more, about eleven inches or more, or about twelve inches, or more. The elongated tack-offs 165 disposed proximate the corners 24 may have a length of about three inches or more, about four inches or more, about five inches or more, about six inches or more, about seven inches or more, about eight inches or more, about nine inches or more, about ten inches or more, about eleven inches or more, or about twelve inches, or more.

The elongated tack-offs 165 may provide increased strength, rigidity, and/or structural integrity. The elongated tack-offs 165 may also provide different properties and characteristics because, for example, of the elongated contact area between opposing surfaces of the molded plastic structure. As discussed elsewhere, the elongated tack-offs 165 may impede or prevent gas flow during the blow-molding process.

The elongated tack-offs 165 may be disposed between adjacent risers 126. In particular, the elongated tack-offs 165 may be at least substantially disposed between adjacent risers 165. For example, the elongated tack-offs may extend from one riser 126 to the adjacent riser 165. In greater detail, a first end of the elongated tack-off 165 may be disposed at least proximate to a first riser 126 and a second end of the elongated tack-off 165 may be disposed at least proximate to second riser 126. Thus, the elongated tack-offs 165 may be at least substantially or completely disposed between adjacent risers 126.

In an exemplary embodiment, the elongated tack-offs 165 may prevent other structures, such as gaps or openings, from being disposed between adjacent risers 126. The elongated tack-offs 165 may also impede or prevent gas flow between adjacent risers 126 during the blow-molding process when the elongated tack-offs 165 are formed. The elongated tack-offs 165 may also create a seal or at least a portion of a seal between adjacent risers 126.

The elongated tack-offs 165 may have generally the same length, which may facilitate more uniform gas flow during the blow-molding process. For example, the tabletop 12 may include a plurality of elongated tack-offs 165 and the elongated tack-offs 165 may have generally the same length and be disposed proximate the lip 13. Advantageously, if the elongated tack-offs 165 have generally the same length and are disposed in a generally uniform pattern, more uniform gas flow may occur during the blow-molding process.

The elongated tack-offs 165 may have a first length along the sides 22 of the tabletop 12 and a second length along the ends 26 of the tabletop 12. If desired, the elongated tack-offs 165 along the sides 22 and the ends 26 of the tabletop 12 may have generally the same length. That is, in this exemplary embodiment, all or substantially all the elongated tack-offs 165 may have generally the same length. If adjacent elongated tack-offs 165 have generally the same length along the sides 22 and/or ends 26 of the tabletop 12, more uniform gas flow may occur during the blow-molding process. In addition, the tabletop 12 may have more uniform properties or characteristics if the elongated tack-offs 165 have generally the same lengths.

The elongated tack-offs 165 may also have generally the same length in one or more corners 24 of the tabletop 12. For example, an elongated tack-off 165 may be disposed in each corner 24 and the elongated tack-offs 165 may have generally the same length. Advantageously, the corners 24 may have more uniform properties and/or characteristics if the elongated tack-offs 165 have generally the same length. As shown in the accompanying figures, the elongated tack-offs 165 may span the entire radius or curved portion of the corner 24. That is, the elongated tack-offs 165 may extend from where the corner 24 begins on one side of the tabletop 12 to where the corner 24 ends on another side of the tabletop 12. The elongated tack-offs 165 may also have a length greater than the radius or curved portion of the corner 24. For instance, the elongated tack-offs 165 may extend from a riser 126 disposed along one side of the tabletop 12, such as the side 22, around the corner 24, and to a riser 126 disposed along another side of the tabletop, such as the end 26. If desired, the length of the elongated tack-offs 165 in the corners 24 may be generally the same as the length of the elongated tack-offs 165 disposed along at least a portion of the sides 22 and/or the ends 26 of the tabletop 12. If one or more of the lengths of the elongated tack-offs 165 along the sides 22, the ends 26, and/or the corners 24 are generally the same, more even gas flow may occur during the blow-molding process.

One skilled in the art, after reviewing this disclosure, will understand that the elongated tack-offs 165 may have the same or different lengths depending, for example, upon the spacing of pairs of adjacent risers 126. For instance, one or more pairs of adjacent risers 126 may be separated by a first distance and the elongated tack-offs 165 disposed between these pairs of adjacent risers 126 may have generally the same lengths, which may be generally equal to the first distance separating the pairs of adjacent risers 126. One or more pairs of adjacent risers 126 may also be separated by a second distance and the elongated tack-offs 165 disposed between these pairs of adjacent risers 126 may have generally the same lengths, which may be generally equal to the second distance separating the pairs of adjacent risers 126.

The elongated tack-offs 165 may be disposed about a substantial portion of a perimeter 15 of the tabletop 12. For example, a plurality of pairs of adjacent risers may be disposed about the perimeter 15 of the tabletop 12 and an elongated tack-off may be disposed between each pair of adjacent risers. A combined length of the plurality of elongated tack-offs may be a length that is greater than about fifty percent (50%) of the perimeter, greater than about sixty percent (60%) of the perimeter, greater than about seventy percent (70%) of the perimeter, greater than about eighty percent (80%) of the perimeter, greater than about ninety percent (90%) of the perimeter, or more.

The risers 126 and the elongated tack-offs 165 provide surprising and unexpected results because, at the time of the invention, one skilled in the art would have thought the elongated tack-offs 165 would prevent the lip 13 from correctly forming during the blow-molding process. The risers 126 and the elongated tack-offs 165, however, provide the surprising and unexpected result that a tabletop 12 could be created with the lip 13 that is separated from the body portion 86 of the tabletop 12 by the plurality of elongated tack-offs 165. In particular, it was surprising and unexpected to one skilled in the art that the lip 13 could be formed during the blow-molding process because it would have been thought that the elongated tack-offs 165 would create significant obstacles and difficulties that would lead to failure during the blowing molding process. For example, it was previously thought that gas flow and/or pressure would be insufficient to form the lip 13 with the plurality of elongated tack-offs 165 disposed between the body portion 86 of the tabletop 12 and the lip 13. Additionally, it was previously thought that the gas flow and/or pressure would be insufficient to create the compression edge and/or the hollow interior portion 138 of the lip 13 because of the plurality of elongated tack-offs 165. Further, it was previously thought that the lip 13 would not properly form because, for example, of the considerable distance that the gas would have to travel and/or the gas pressure would decrease. It was also previously thought that the elongated tack-offs 165 would impede or prevent gas flow such that it would preclude the lip 13 from properly forming during the blow-molding process, especially because the elongated tack-offs 165 may be disposed between at least a majority of the body portion 86 of the tabletop 12 and lip 13.

Another surprising and unexpected result is the elongated tack-offs 165 can have a much greater length than a traditional tack-off, such as the depressions 60, and the lip 13 of the tabletop 12 can be properly formed during the blow-molding process. For example, large, generally planar structures constructed from blow-molded plastic may include a plurality of depressions 60 in a generally uniform pattern but the lengths of the depressions 60 typically have a length of one (1) inch or less to facilitate gas flow and/or minimize disruptions, disturbances, etc. in the gas flow. Contrary to what was expected by one skilled in the art, the elongated tack-offs 165 could have a length two, three, four, five, six, or more times the length of the traditional depression 60. Moreover, the elongated tack-offs 165 could be positioned between the central body portion 86 of the tabletop 12 the lip 13, and the lip 13 could be properly formed during the blow-molding process.

One of ordinary skill in the art may appreciate after reviewing this disclosure that the tables and tabletops disclosed herein may have a number of different aspects, features, characteristics, and configurations. Further, a table and/or tabletop may have any suitable number of aspects, features, characteristics, and configurations depending, for example, upon the intended use of the table.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A blow-molded plastic tabletop constructed using a blow-molding process, the blow-molded plastic tabletop comprising:
    a body portion including an upper surface, a lower surface, and a hollow interior portion disposed between the upper surface and the lower surface;
    a lip extending downwardly from the lower surface, the lip including an outer surface and an inner surface;
    a pair of risers extending inwardly from the inner surface of the lip, each riser of the pair of risers including a first portion extending inwardly into the body portion and a second portion connected to the inner surface of the lip; and
    an elongated tack-off disposed between the pair of risers, the elongated tack-off including a first end disposed at least proximate a first riser of the pair of risers and a second end disposed at least proximate a second riser of the pair of risers, the elongated tack-off having a length at least three times greater than a height of the lip, the elongated tack-off at least substantially preventing fluid flow between the body portion and the lip.

2. The blow-molded plastic tabletop of claim 1, wherein the elongated tack-off is generally disposed between an edge of the body portion and the lip.

3. The blow-molded plastic tabletop of claim 1, wherein the elongated tack-off has a length of at least ten inches.

4. The blow-molded plastic tabletop of claim 1, further comprising:
    a first gas flow pathway at least partially formed by the hollow interior portion of the body portion and a hollow interior portion of the first riser; and
    a second gas flow pathway at least partially formed by the hollow interior portion of the body portion and a hollow interior portion of the second riser.

5. The blow-molded plastic tabletop of claim 1, wherein the body portion, the lip, the pair of risers, and the elongated tack-off are integrally formed as part of a unitary, one-piece structure during the blow-molding process.

6. The blow-molded plastic tabletop of claim 1, further comprising a structural feature disposed between the pair of risers.

7. The blow-molded plastic tabletop of claim 1, wherein the body portion comprises a center portion of the tabletop.

8. The blow-molded plastic tabletop of claim 1, wherein a first pair of risers are disposed along a first side of the tabletop, a second pair of risers are disposed along a second side of the tabletop, a third part of risers are disposed along a third side of the tabletop, and a fourth pair of risers are disposed along a fourth side of the tabletop.

9. The blow-molded plastic tabletop of claim 1, further comprising a corner of the tabletop, a first riser of the pair of risers disposed on a first side of the corner and a second riser of the pair of risers disposed on a second side of the corner, the elongated tack-off extending along a radius of the corner between the pair of risers.

10. The blow-molded plastic tabletop of claim 1, wherein the tabletop includes a perimeter;
    wherein the pair of risers are part of a plurality of pairs of risers;
    wherein the elongated tack-off has a length measured from a first end to a second end;
    wherein the elongated tack-off is part of a plurality of elongated tack-offs;
    wherein an elongated tack-off is disposed between each pair of risers; and
    wherein a combined length of the plurality of elongated tack-offs comprises a length that is:
    greater than fifty percent (50%) of the perimeter,
    greater than sixty percent (60%) of the perimeter,
    greater than seventy percent (70%) of the perimeter,
    greater than eighty percent (80%) of the perimeter, or
    greater than ninety percent (90%) of the perimeter.

11. A blow-molded plastic tabletop constructed using a blow-molded process, the blow-molded plastic tabletop comprising:
    a body portion comprising an upper surface, a lower surface, and a hollow interior portion disposed between the upper surface and the lower surface;
    a lip extending outwardly from the body portion, the lip including an outer surface and an inner surface;
    a plurality of risers extending inwardly from the inner surface of the lip, each riser of the plurality of risers extending inwardly into a lower surface of the body portion and extending inwardly from the inner surface of the lip; and
    a plurality of elongated tack-offs, an elongated tack-off of the plurality of elongated tack-offs disposed between a pair of adjacent risers of the plurality of risers, the elongated tack-off having a length at least three times greater than a height of the lip.

12. The blow-molded plastic tabletop of claim 11, further comprising a structural feature disposed between a pair of adjacent risers of the plurality of risers.

13. The blow-molded plastic tabletop of claim 11, wherein a first end of the elongated tack-off disposed between a pair of adjacent risers of the plurality of risers is disposed at least proximate a first riser of the pair risers and a second end of the elongated tack-off is disposed at least proximate a second riser of the pair of risers.

14. The blow-molded plastic tabletop of claim 11, wherein the elongated tack-off disposed between a pair of adjacent risers of the plurality of risers has a length generally equal to a distance separating the adjacent risers.

15. The blow-molded tabletop of claim 11, wherein the body portion comprises a central portion of tabletop and the lip extends downwardly relative to the lower surface of the tabletop.

16. The blow-molded tabletop of claim 11, wherein a majority of risers of the plurality of risers are spaced generally an equidistance apart.

17. The blow-molded tabletop of claim 11, wherein a majority of risers of the plurality of risers are spaced generally an equidistance apart along at least a portion of a side of the tabletop and along at least a portion of an end of the tabletop.

18. The blow-molded tabletop of claim 11, further comprising a corner of the tabletop, the corner including a first end and a second end, an elongated tack-off of the plurality of elongated tack-offs extending between the first end and the second end of the corner.

19. The blow-molded plastic tabletop of claim 11, further comprising:
- a corner of the tabletop, the corner including a first end, a second end and a radius;
- a first riser of a pair of risers of the plurality of risers disposed proximate the first end of the corner;
- a second riser of the pair of risers of the plurality of risers disposed proximate the second end of the corner; and
- an elongated tack-off of the plurality of tack-offs extending along the radius of the corner and between the first riser and the second riser.

20. A blow-molded plastic tabletop constructed using a blow-molding process, the blow-molded plastic tabletop comprising:
- a generally planar body portion including an upper surface, a lower surface, and a hollow interior portion disposed between the upper surface and the lower surface;
- a lip extending outwardly from the body portion, the lip including an elongated portion extending along a side of the tabletop, elongated portion of the the lip including a generally planar outer surface aligned with a first plane and a generally planar inner surface aligned with a second plane, the first plane and the second plane disposed in a generally parallel configuration, the first plane and the second plane separated by a generally constant distance;
- a pair of adjacent risers extending inwardly from the inner surface of the elongated portion of the lip toward a center portion of the body portion; and
- an elongated tack-off disposed between the pair of adjacent risers, the elongated tack-off at least substantially preventing fluid communication between the generally planar body portion and the lip between the pair of adjacent risers, a first end of the elongated tack-off disposed at least proximate a first riser of the pair of adjacent risers and a second end of the elongated tack-off disposed at least proximate a second riser of the pair of adjacent risers.

* * * * *